United States Patent
Iwasaki et al.

(10) Patent No.: US 11,486,453 B2
(45) Date of Patent: Nov. 1, 2022

(54) AUTOMATIC TRANSMISSION AND CENTRIFUGAL BALANCE ADJUSTMENT METHOD FOR AUTOMATIC TRANSMISSION

(71) Applicant: Mazda Motor Corporation, Hiroshima (JP)

(72) Inventors: Tatsuhiko Iwasaki, Aki-gun (JP); Keiichi Nakamura, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/452,750

(22) Filed: Oct. 28, 2021

(65) Prior Publication Data

US 2022/0154780 A1     May 19, 2022

(30) Foreign Application Priority Data

Nov. 13, 2020 (JP) .............................. JP2020-189741

(51) Int. Cl.
    *F16D 25/0638*     (2006.01)
    *F16D 48/02*     (2006.01)
    *F16D 25/10*     (2006.01)

(52) U.S. Cl.
    CPC ......... *F16D 25/0638* (2013.01); *F16D 25/14* (2013.01); *F16D 25/10* (2013.01)

(58) Field of Classification Search
None
See application file for complete search history.

(56) References Cited

U.S. PATENT DOCUMENTS

| 3,243,026 | A | * | 3/1966 | Black | F16D 25/0638 |
|---|---|---|---|---|---|
| | | | | | 192/85.33 |
| 6,305,521 | B1 | * | 10/2001 | Hall, III | F16D 25/12 |
| | | | | | 192/85.41 |
| 2011/0233019 | A1 | * | 9/2011 | Ohashi | F16D 25/10 |
| | | | | | 192/3.26 |
| 2013/0075216 | A1 | * | 3/2013 | Seo | F16D 25/12 |
| | | | | | 192/48.601 |
| 2015/0250886 | A1 | * | 9/2015 | Bhandari | A61K 47/26 |
| | | | | | 514/777 |

FOREIGN PATENT DOCUMENTS

| JP | 2015172378 A | | 10/2015 | |
|---|---|---|---|---|
| KR | 20050027220 A | * | 3/2005 | ............ F16D 21/06 |

* cited by examiner

*Primary Examiner* — Timothy Hannon
(74) *Attorney, Agent, or Firm* — Alleman Hall Creasman & Tuttle LLP

(57) ABSTRACT

An automatic transmission includes a clutch having a drum section, a hub, a friction plate, a piston that presses the friction plate, a hydraulic chamber to which hydraulic oil is supplied to urge the piston in a direction toward the friction plate, and a cancellation chamber to which hydraulic oil is supplied to cancel a centrifugal hydraulic pressure applied to the hydraulic oil in the hydraulic chamber, and the piston is interposed between the hydraulic chamber and the cancellation chamber. The drum section includes communication passages that extend in a radial direction and respectively communicate with the hydraulic chamber and the cancellation chamber. Of the communication passages, in the communication passage that communicates with the cancellation chamber, an adjustment member is provided at an end portion on a radially inner side, and can adjust an atmospheric air release position of the communication passage in the radial direction.

20 Claims, 10 Drawing Sheets

AUTOMATIC TRANSMISSION AND CENTRIFUGAL BALANCE ADJUSTMENT METHOD FOR AUTOMATIC TRANSMISSION

TECHNICAL FIELD

The present invention relates to an automatic transmission that is mounted on a vehicle and to a centrifugal balance adjustment method for an automatic transmission.

BACKGROUND ART

An automatic transmission that is mounted on a vehicle such as an automobile is configured to switch a power transmission path including a planetary gear set and the like by means of selective engagement of a plurality of friction engagement elements including a clutch, a brake, and the like, and thereby achieves a specified gear shift stage according to a driving state of the vehicle.

The clutch that is used in such an automatic transmission generally includes a drum member, a hub member, a plurality of friction plates arranged between the drum member and the hub member, a piston pressing the plurality of friction plates, and a hydraulic chamber supplied with hydraulic oil to urge the piston in a friction plate direction.

As disclosed in JP2015-172378A, there is a case where the clutch for the automatic transmission is provided with a cancellation chamber on an opposite side of the piston from a hydraulic chamber in order to prevent dragging of the friction plates, which occurs when the friction plates are pressed by a centrifugal force applied to the hydraulic oil in the hydraulic chamber in a disengaged state. In this way, by a disengagement-side load that is applied to the piston by the centrifugal force that is applied to the hydraulic oil supplied to the cancellation chamber (hereinafter also referred to as a "centrifugal hydraulic pressure"), an engagement-side load that is applied to the piston by the centrifugal hydraulic pressure in the hydraulic chamber is cancelled. Here, in regard to the disengagement-side load of a case where the clutch includes an urging member to urge the piston in a direction to disengage the friction plates, a load that is applied to the piston by the urging member is added to the load that is applied to the piston by the centrifugal hydraulic pressure in the cancellation chamber.

In recent years, the automatic transmissions are provided with multiple gears for purposes of improving fuel efficiency and the like of the vehicles. In conjunction therewith, the number of the planetary gear sets constituting a gear shift mechanism tends to be increased. However, when the number of the planetary gear sets is increased, an axial dimension of the entire transmission is increased, which produces a problem of mountability.

To handle such a problem, for example, in the automatic transmission disclosed in JP2015-172378A, three hydraulic clutches for switching the power transmission path of the gear shift mechanism are arranged to overlap in an axial direction. In this way, compared to a case where these clutches are arranged in parallel in the axial direction, the axial dimension of the entire transmission is reduced. In regard to the clutches in JP2015-172378A, the hydraulic chambers and the cancellation chambers that are provided for the three clutches are also superimposed on an inner side and an outer side in a radial direction. In this way, compared to a case where these oil chambers are aligned in the axial direction, the axial dimension of the entire transmission is reduced.

SUMMARY OF THE INVENTION

Problem to be Solved by the Invention

However, in the case where the plurality of clutches are arranged to overlap in the axial direction like the clutches disclosed in JP2015-172378A, radii of the hydraulic chamber and the cancellation chamber located on a radially outer side are particularly larger than those of the hydraulic chamber and the cancellation chamber on a radially inner side. Accordingly, for example, even in the case where a slight manufacturing error in an outer diameter of the cancellation chamber is present, the centrifugal hydraulic pressure in the cancellation chamber varies, which possibly loses balance between the engagement-side load and the disengagement-side load.

More specifically, the centrifugal hydraulic pressure is usually generated to have a magnitude that corresponds to a distance from a rotation center thereof with the rotation center being an origin (the centrifugal hydraulic pressure at zero). Accordingly, for example, in the case where outer diameters of a seal plate and the piston, which constitute the cancellation chamber, are increased due to the manufacturing error, the centrifugal hydraulic pressure in the cancellation chamber becomes excessive. As a result, it may be necessary to supply, to the hydraulic chamber during engagement, such a magnitude of a hydraulic pressure that resists the centrifugal hydraulic pressure in the cancellation chamber. On the contrary, in the case where the outer diameters of the seal plate and the piston, which constitute the cancellation chamber, are reduced due to the manufacturing error, the centrifugal hydraulic pressure in the cancellation chamber becomes insufficient. As a result, it becomes difficult to cancel dragging of the friction plates caused by the centrifugal hydraulic pressure in the hydraulic chamber.

The present disclosure has a purpose of providing an automatic transmission and a centrifugal balance adjustment method for an automatic transmission capable of eliminating an imbalance between an engagement-side load and a disengagement-side load, which is caused by variation in a centrifugal hydraulic pressure in a cancellation chamber possibly caused by a manufacturing error or the like, in an automatic transmission including a hydraulic chamber and the cancellation chamber.

Means for Solving the Problem

In order to solve this problem, an automatic transmission and a centrifugal balance adjustment method for an automatic transmission according to the present disclosure are configured as follows.

A first aspect of the present disclosure provides an automatic transmission including a clutch that includes: a cylindrical drum section; a cylindrical hub section that opposes the drum section; a friction plate that is engaged in an axially slidable manner between the drum section and the hub section; and a piston that presses the friction plate; a hydraulic chamber to which hydraulic oil is supplied to urge the piston in a direction toward the friction plate; and a cancellation chamber to which hydraulic oil is supplied to cancel a centrifugal hydraulic pressure applied to the hydraulic oil in the hydraulic chamber, the piston being interposed between the hydraulic chamber and the cancellation chamber. The drum section includes communication passages that extend in a radial direction and respectively communicate with the hydraulic chamber and the cancellation chamber. Of the communication passages, in the communication passage that communicates with the cancellation chamber, an adjustment member is provided at an end portion on a radially inner side, and is configured to adjust an atmospheric air release position of the communication passage in the radial direction.

According to the present disclosure, it is possible to adjust the atmospheric air release position that is involved in the centrifugal hydraulic pressure in the cancellation chamber by adjusting the radial position of the adjustment member. In this way, it is possible to eliminate an imbalance between an engagement-side load and a disengagement-side load caused by variation in the centrifugal hydraulic pressure in the cancellation chamber possibly caused by a manufacturing error or the like by adjusting the atmospheric air release position in the cancellation chamber.

The centrifugal hydraulic pressure is usually generated to have a magnitude that corresponds to a distance from a rotation center thereof with the rotation center being an origin (the centrifugal hydraulic pressure at zero). However, by providing a position that comes into contact with atmospheric air (an atmospheric air release position) in an intermediate portion away from the rotation center, the centrifugal hydraulic pressure at this position is higher than zero. Thus, the centrifugal hydraulic pressure is not generated on the rotation center side.

Accordingly, the centrifugal hydraulic pressure is generated between a diameter (a release end diameter) from the rotation center to the atmospheric air release position and an outer diameter of the cancellation chamber. Thus, it is possible to adjust the centrifugal hydraulic pressure in the cancellation chamber by adjusting a radial position of the atmospheric air release position.

More specifically, for example, in the case where a load applied to the piston by the centrifugal hydraulic pressure in the cancellation chamber is large due to a manufacturing error of the piston or the like, it is possible to reduce the centrifugal hydraulic pressure in the cancellation chamber by adjusting the position of the adjustment member to a radially outer position. On the contrary, in the case where the load applied to the piston by the centrifugal hydraulic pressure in the cancellation chamber is small, it is possible to increase the centrifugal hydraulic pressure in the cancellation chamber by adjusting the position of the adjustment member to a radially inner position.

An outer diameter of a cancellation chamber seal that seals an outer diameter of the piston constituting the cancellation chamber may be set to be larger than an outer diameter of a hydraulic chamber seal that seals an outer diameter of the piston constituting the hydraulic chamber.

For example, in the case where the outer diameter of the cancellation chamber seal is set to be equal to or smaller than the outer diameter of the hydraulic chamber seal, it is considered to adjust the atmospheric air release position of the cancellation chamber to the radially inner side in order to increase the centrifugal hydraulic pressure in the cancellation chamber. However, since the radially inner side in a transmission case approaches an axis, it is difficult to secure a space for arranging the adjustment member having a specified adjustment margin.

To handle the above problem, according to the above configuration, the outer diameter of the cancellation chamber seal is set to be larger than the outer diameter of the hydraulic chamber seal. Accordingly, it is possible to arrange the adjustment member in a portion with a relatively large space on a radially outer side of the radially innermost position of the communication passage for the hydraulic chamber. Therefore, it is possible to easily secure an adjustment margin for adjusting the atmospheric air release position to the radially inner side for a purpose of increasing the centrifugal hydraulic pressure in the cancellation chamber and an adjustment margin for adjusting the atmospheric air release position to the radially outer side for a purpose of reducing the centrifugal hydraulic pressure.

The adjustment member may be arranged to be inclined with respect to the radial direction.

With this configuration, compared to a case where the adjustment member is arranged in the radial direction, it is possible to reduce sensitivity of a displacement amount of the radial position with respect to the stroke amount of the adjustment member, and thus to precisely adjust the radial position of the adjustment member.

The adjustment member may have a double nut structure.

With this configuration, it is possible with the simple structure to suppress displacement of the adjustment member possibly caused after the adjustment member is arranged at a position where the imbalance between the engagement-side load and the disengagement-side load is eliminated.

The adjustment member may be arranged in an adjustment circuit for atmospheric air release position adjustment that communicates with the cancellation chamber, and the adjustment circuit may differ from the communication passage used to supply the hydraulic oil to the cancellation chamber.

With this configuration, the hydraulic oil is supplied to the cancellation chamber without flowing through the atmospheric air release position. Thus, compared to the case where the adjustment member is provided in the communication passage used to supply the hydraulic oil to the cancellation chamber, it is easy to maintain a state where the hydraulic oil is supplied to the cancellation chamber. In this way, a state where the centrifugal hydraulic pressure is only applied to the hydraulic oil in the hydraulic chamber is easily avoided.

The clutch may be one of at least two clutches. The hydraulic chambers and the cancellation chambers of the at least two clutches may be provided to overlap in the axial direction. The adjustment circuit may be provided to at least communicate with the cancellation chamber located on the radially outermost side among the cancellation chambers.

With this configuration, it is possible to adjust the atmospheric air release position of the cancellation chamber with the outermost diameter at which a difference between the centrifugal hydraulic pressure in the hydraulic chamber and the centrifugal hydraulic pressure in the cancellation chamber possibly caused by variation in a radial dimension by the manufacturing error.

A second aspect of the present disclosure provides a centrifugal balance adjustment method for an automatic transmission which includes a clutch that comprises: a cylindrical drum section; a cylindrical hub section that opposes the drum section; a friction plate that is engaged in an axially slidable manner between the drum section and the hub section; a piston that presses the friction plate; a hydraulic chamber to which hydraulic oil is supplied to urge the piston in a direction toward the friction plate; and a cancellation chamber to which hydraulic oil is supplied to cancel a centrifugal hydraulic pressure applied to the hydraulic oil in the hydraulic chamber, the piston being interposed between the hydraulic chamber and the cancellation chamber, the drum section including communication passages that extend in a radial direction and respectively communicate with the hydraulic chamber and the cancellation chamber. The centrifugal balance adjustment method includes: providing an adjustment member at an end portion on a radially inner side of the communication passage that communicates with the cancellation chamber among the communication passages, the adjustment member being configured to adjust an atmospheric air release position of the communication passage in the radial direction; generating the centrifugal hydraulic pressure in each of the hydraulic chamber and the cancellation chamber in a state where the adjustment member is located at a specified position on the radially outermost side; and adjusting the adjustment member toward a radially inner side so as to thereafter obtain a state where a load in a direction in which the piston presses the friction plate becomes zero.

With this configuration, it is possible to adjust the atmospheric air release position that is involved in the centrifugal hydraulic pressure of the cancellation chamber by adjusting the radial position of the adjustment member. In this way, it is possible to eliminate the imbalance between the engagement-side load and the disengagement-side load, which is caused by the variation in the centrifugal hydraulic pressure in the cancellation chamber possibly caused by the manufacturing error or the like.

A third aspect of the present disclosure provides a centrifugal balance adjustment method for an automatic transmission which includes a clutch that comprises: a cylindrical drum section; a cylindrical hub section that opposes the drum section; a friction plate that is engaged in an axially slidable manner between the drum section and the hub section; and a piston that presses the friction plate; a hydraulic chamber to which hydraulic oil is supplied to urge the piston in a direction toward the friction plate; and a cancellation chamber to which hydraulic oil is supplied to cancel a centrifugal hydraulic pressure applied to the hydraulic oil in the hydraulic chamber, the piston being interposed between the hydraulic chamber and the cancellation chamber, the drum section including communication passages that extend in a radial direction and respectively communicate with the hydraulic chamber and the cancellation chamber. The centrifugal balance adjustment method includes: providing an adjustment member at an end portion on a radially inner side of the communication passage that communicates with the cancellation chamber among the communication passages, the adjustment member being configured to adjust an atmospheric air release position of the communication passage in the radial direction; measuring an outer diameter of the hydraulic chamber, an inner diameter of the hydraulic chamber, a radially innermost position of the communication passage that communicates with the hydraulic chamber, and an outer diameter of the cancellation chamber as measurements; when the centrifugal hydraulic pressure is generated in each of the hydraulic chamber and the cancellation chamber, calculating, from the measurements, a radial position of the adjustment member such that an engagement-side load matches a disengagement-side load, the engagement-side load being applied to the piston from the hydraulic chamber side toward the cancellation chamber side, and the disengagement-side load being applied to the piston from the cancellation chamber side toward the hydraulic chamber side; and adjusting the adjustment member to the calculated radial position in advance.

With this configuration, it is possible to adjust the atmospheric air release position that is involved in the centrifugal hydraulic pressure of the cancellation chamber by adjusting the radial position of the adjustment member. In this way, it is possible to eliminate the imbalance between the engagement-side load and the disengagement-side load, which is caused by the variation in the centrifugal hydraulic pressure in the cancellation chamber and in the centrifugal hydraulic pressure in the hydraulic chamber possibly caused by the manufacturing error or the like.

Advantage of the Invention

According to the present disclosure, it is possible to provide the automatic transmission and the centrifugal balance adjustment method for the automatic transmission capable of eliminating the imbalance between the engagement-side load and the disengagement-side load, which is caused by the variation in the centrifugal hydraulic pressure in the cancellation chamber and in the centrifugal hydraulic pressure in the hydraulic chamber possibly caused by the manufacturing error or the like, in the automatic transmission including the hydraulic chamber and the cancellation chamber.

MODES FOR CARRYING OUT THE INVENTION

A description will hereinafter be made on an embodiment of the present disclosure.

Figure 1:
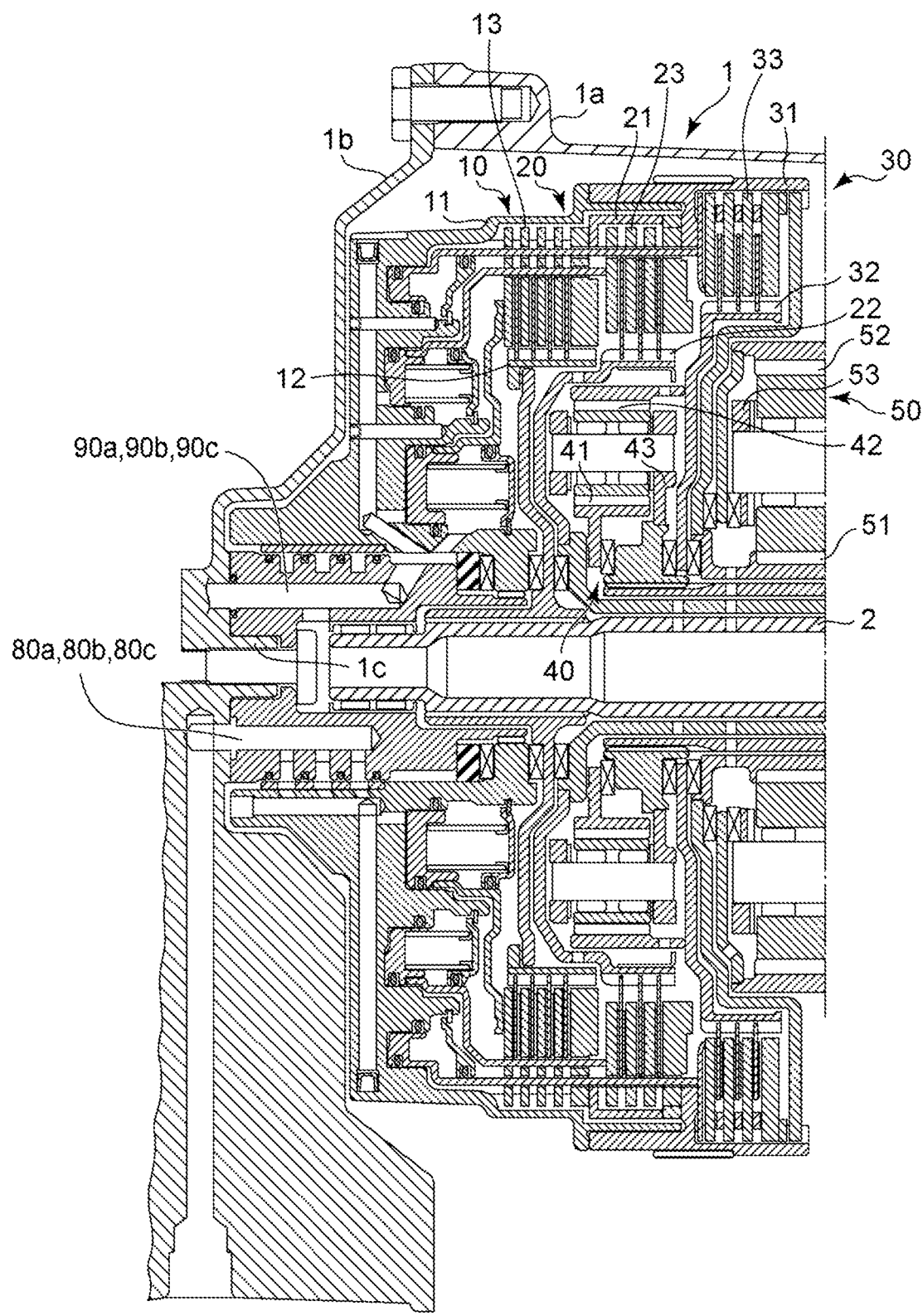
FIG. 1 is a cross-sectional view of a rear portion of an automatic transmission according to an embodiment of the present disclosure.

FIG. 1 illustrates a configuration of an automatic transmission on an opposite side of a drive source (hereinafter, the opposite side of the drive source will be referred to as a rear side or one axial side, and a drive source side will be referred to as a front side or an other axial side). In a rear portion of a transmission case 1 having: a body case 1*a*; and an end cover 1*b* that closes an opening at a rear end of the body case 1*a*, first, second, and third clutches 10, 20, 30 and first and second planetary gear sets 40, 50 are disposed from the rear side on an input shaft 2 that extends from the drive source side. The first, second, and third clutches 10, 20, 30 respectively include a plurality of friction plates 13, 23, 33 that are aligned in an axial direction, and the first and second planetary gear sets 40, 50 are aligned in the axial direction.

The first and second planetary gear sets 40, 50 have, as rotary elements, sun gears 41, 51, ring gears 42, 52, and pinion carriers 43, 53, respectively.

The first, second, and third clutches 10, 20, 30 respectively have: drum members 11, 21, 31 that are joined and rotate integrally during engagement; and hub members 12, 22, 32. The drum member 31 in the third clutch 30, as the second other-side clutch, that is located farthest on the other axial side (the drive source side) is connected to the sun gear 51 in the second planetary gear set 50. The hub member 32 in the third clutch 30 is coupled to the ring gear 42 of the first planetary gear set 40.

The drum member 21 in the second clutch 20, as the first other-side clutch, is arranged on the one axial side of the drum member 31 in the third clutch 30. The drum member 21 in the second clutch 20 is connected to the drum members 31 in the third clutch 30 in a manner to integrally rotate therewith. The drum member 21 in the second clutch 20 is spline-fitted to an inner circumferential side of the drum member 11, which is press-inserted in an inner circumferential side of the third clutch 30, in the first clutch 10, and is connected to the sun gear 51 in the second planetary gear set 50 via the drum member 11 in the first clutch 10 and the drum member 31 in the third clutch 30. The hub member 22 in the second clutch 20 is coupled to a ring gear in another planetary gear set, which is not illustrated.

On the one axial side of the drum member 21 in the second clutch 20, the drum member 11 in the first clutch 10, as the one-side clutch, is integrally formed with an extending section 11b, which will be described below, and to which the drum member 21 in the second clutch 20 is spline-fitted. The drum member 11 in the first clutch 10 is connected to the sun gear 51 in the second planetary gear set 50 via the drum member 31 in the third clutch 30. The hub member 12 in the first clutch 10 is coupled to the input shaft 2 of the automatic transmission.

Next, a description will be made on configurations of the first, second, and third clutches 10, 20, 30 with reference to FIG. 2 and FIG. 3. FIG. 3 includes exploded perspective views of pistons, the friction plates, and the drum members constituting the first to third clutches 10, 20, 30.

The first, second, and third clutches 10, 20, 30 respectively have, in addition to the drum members 11, 21, 31 and the hub members 12, 22, 32: the plurality of friction plates 13, 23, 33 that are aligned in the axial direction therebetween and alternately spline-engaged with the drum members 11, 21, 31 and the hub members 12, 22, 32, respectively; pistons 14, 24, 34 that are arranged behind (on the one axial side of) these friction plates 13, 23, 33, respectively; and hydraulic chambers 15, 25, 35 that are provided in back portions of the pistons 14, 24, 34. When an engagement pressure is supplied to any these hydraulic chambers 15, 25, 35 of the clutches 10, 20, 30 to respective one of which the engagement pressure is supplied, respective one of the pistons 14, 24, 34 presses respective one of the friction plates 13, 23, 33 and joins respective one of the drum members 11, 21, 31 to respective one of the hub members 12, 22, 32. In this way, respective one of the clutches 10, 20, 30 is engaged.

In the first, second, and third clutches 10, 20, 30, cancellation chambers 16, 26, 36 are provided on opposite sides of the pistons 14, 24, 34 from the hydraulic chambers 15, 25, 35, respectively. The cancellation chambers 16, 26, 36 are provided to prevent dragging of the friction plates 13, 23, 33, which occurs when the friction plates 13, 23, 33 are pressed by centrifugal forces applied to hydraulic oil in the hydraulic chambers 15, 25, 35 in a disengaged state. In this way, the pistons 14, 24, 34 are pressed by the centrifugal forces that are applied to the hydraulic oil supplied to the cancellation chambers 16, 26, 36, and thus pressing forces that are generated by the centrifugal forces applied to the hydraulic oil in the hydraulic chambers 15, 25, 35 are canceled.

In the cancellation chambers 16, 26 of the first clutch 10 and the second clutch 20, return springs 17, 27 are disposed to urge the pistons 14, 24 in a clutch disengagement direction, respectively. In the third clutch 30, instead of a return spring, an urging member 37, which will be described below, is arranged between the plurality of friction plates 33.

The plurality of friction plates 13, 23, 33 in the first, second, and third clutches 10, 20, 30 respectively include: a plurality of outer friction plates 13a, 23a, 33a that are spline-engaged with the drum members 11, 21, 31, respectively; and a plurality of inner friction plates 13b, 23b, 33b that are spline-engaged with the hub members 12, 22, 32 and are alternately arranged with the plurality of outer friction plates 13a, 23a, 33a in the axial direction, respectively.

The drum member 11 in the first clutch 10 includes: an outer cylindrical section 11a with which the outer friction plate 13a is engaged; the extending section 11b that further extends to the one axial side from an end portion on the one axial side of the outer cylindrical section 11a; a vertical wall section 11c that extends radially inward from an end portion of the extending section 11b; and a cylindrical section 11d that extends to the one axial side and the other axial side from an inner end portion on a radially inner side of the vertical wall section 11c.

The hub member 12 in the first clutch 10 includes: an inner cylindrical section 12a with which the inner friction plate 13b is engaged; a disc section 12b that extends radially inward from an end portion on the one axial side of the inner cylindrical section 12a; and a spline section 12c that extends to the one axial side and the other axial side from an inner end portion of the disc section 12b and is spline-fitted to the input shaft 2.

As illustrated in FIG. 3, a spline section 13a1 that is spline-engaged with the outer cylindrical section 11a is provided on an outer circumferential surface of the outer friction plate 13a, and a spline section 13b1 that is spline-engaged with the inner cylindrical section 12a is provided on an inner circumferential surface of the inner friction plate 13b.

In a radially outer portion of the outer friction plate 13a, plurality of first through holes 13c and a plurality of second through holes 13d are provided. The first through holes 13c are provided to cause the piston 24 in the second clutch 20 to pass therethrough in the axial direction. The second through holes 13d are provided to cause the piston 34 in the third clutch 30 to pass therethrough in the axial direction.

The plurality of first through holes 13c and the plurality of second through holes 13d are aligned at equally-spaced intervals in a circumferential direction, and each of the first through holes 13c is arranged at a different circumferential position from corresponding one of the second through holes 13d. In detail, a circumferentially central portion of each of the first through holes 13c and a circumferentially central portion of one of the second through holes 13d adjacent to the first through hole 13c are provided in a state where circumferential positions thereof are misaligned. In this embodiment, a circumferential position of one end portion in the circumferential direction of each of the first through holes 13c overlaps a circumferential position of the other end portion in the circumferential direction of one of the second through holes 13d adjacent to the first through hole 13c. However, the one end portion may not overlap the other end portion.

Figure 2:
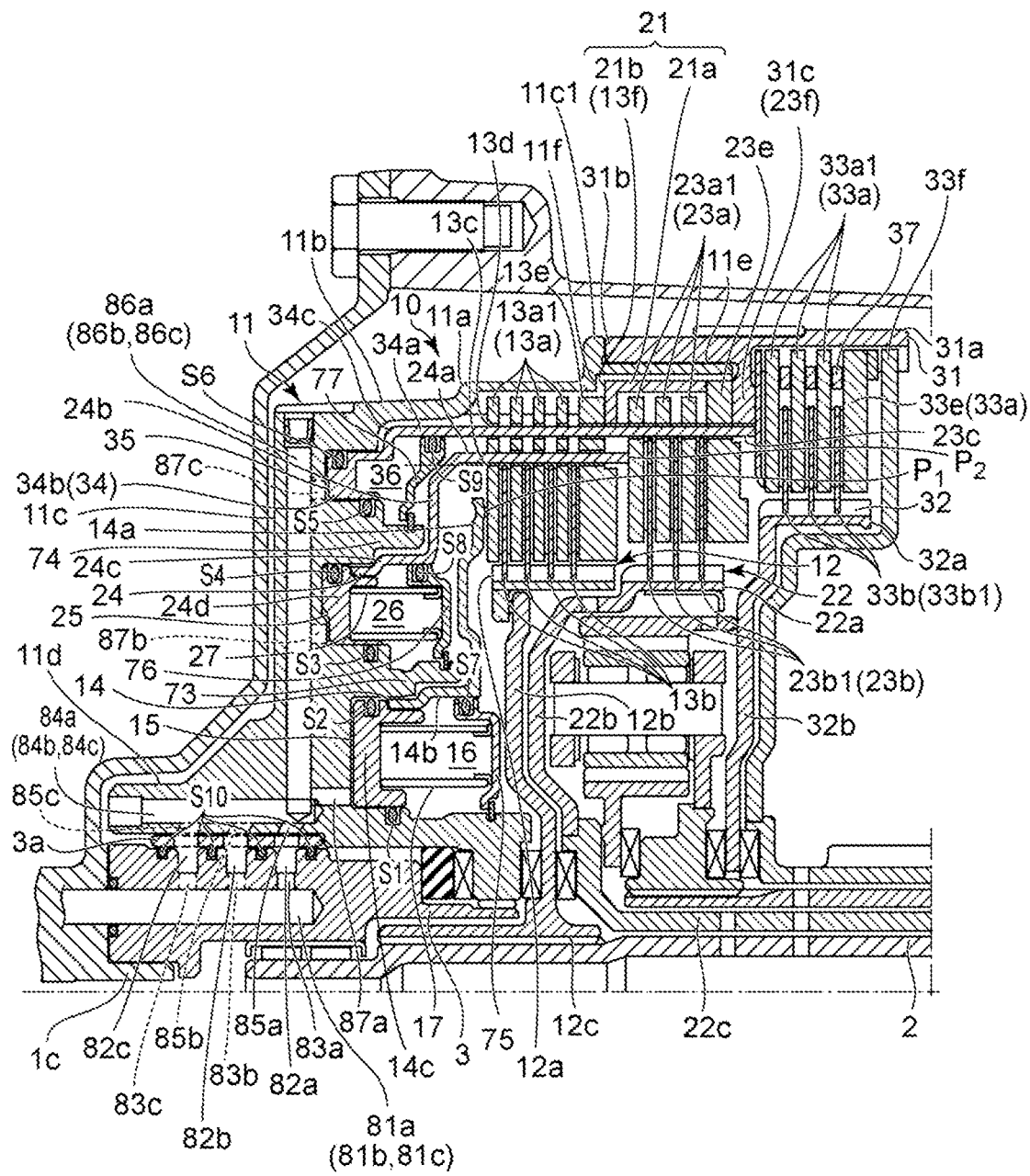
FIG. 2 is an enlarged view of a main section in FIG. 1.
Figure 3:
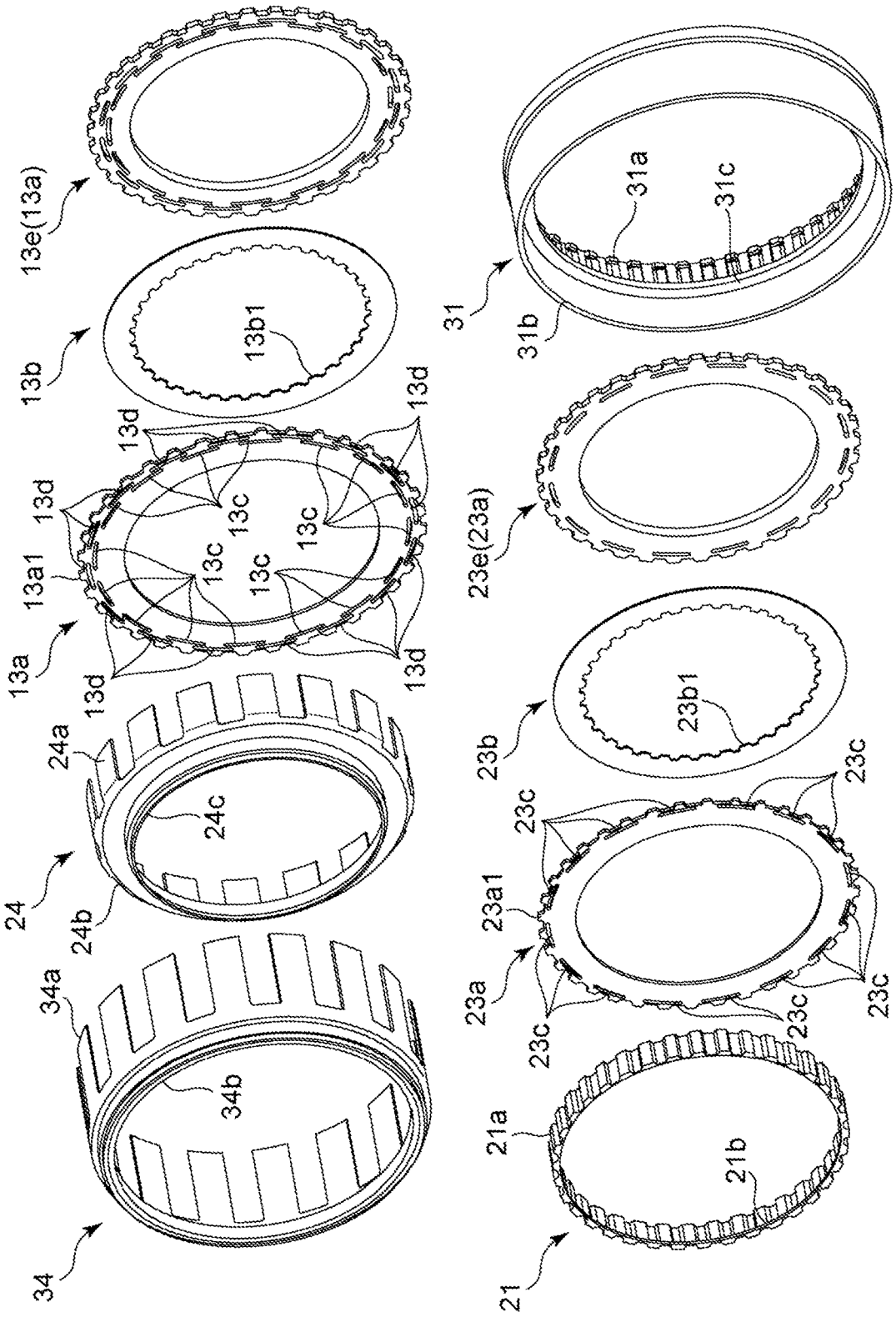
FIG. 3 includes exploded perspective views of pistons and friction plates in first to third clutches.

As illustrated in FIG. 2, a radial position of each of the first through holes 13c is located on an outer side of an outer circumference of each of the inner friction plates 13b. A radial position of each of the second through holes 13d is located on an outer circumferential side of the radial position of each of the first through holes 13c and is located on a radially inner side of the spline section 13a1.

The piston 14 has: a pressing section 14a that is arranged on the one axial side of the friction plates 13a, 13b, extends in the radial direction, and presses the friction plates 13a, 13b during the engagement; a cylindrical section 14b that extends to the one axial side from an inner end portion of the pressing section 14a; and a pressure-receiving section 14c that includes a pressure-receiving surface for receiving a hydraulic pressure supplied to the hydraulic chamber 15. In this embodiment, the pressing section 14a and the cylindrical section 14b are constructed of a different body from the pressure-receiving section 14c. The cylindrical section 14b is coupled to an upper end portion of the pressure-receiving section 14c that is formed in a disc shape.

The hydraulic chamber 15 is arranged such that a radial position thereof is offset from radial positions of the friction plates 13a, 13b. Accordingly, radial positions of the pressing section 14a and the pressure-receiving section 14c in the piston 14 are also offset in a similar manner.

As described above, on a radially inner side of the spline section 13a1 in the outer friction plate 13a, a radial dimension for providing the first and second through holes 13c, 13d is necessary. For this reason, a radial position of the spline section 13a1 and a radial position of a pressing point $P_1$, at which the pressing section 14a of the piston 14 presses the friction plate 13a, are also offset.

Of the plurality of friction plates 13, the outer friction plate 13a that is located farthest on the other axial side constitutes a retaining member 13e. An axial dimension (a plate thickness) of the entire retaining member 13e is set to be greater than a plate thickness of each of the other outer friction plates 13a. The retaining member 13e is set such that a radially inner portion, in particular, a portion corresponding to the pressing point $P_1$, at which the piston 14 abuts the outer friction plate 13a, has the greater plate thickness than a radially outer portion.

A restraining member 13f that restrains axial movement of each of the friction plates 13 is arranged on the other axial side of the retaining member 13e. In this embodiment, a flange section 21b is provided in an end portion on the one axial side of the drum member 21 in the second clutch 20, which will be described below (an adjacent position to the retaining member 13e in the first clutch 10), and the flange section 21b extends to substantially the same radial position as an outer circumference of the first through hole 13c in the radial direction. This flange section 21b is used as the restraining member 13f.

The restraining member 13f is fixed to the outer cylindrical section 11a in a state not being able to move in the axial direction. Accordingly, the restraining member 13f receives the axial load that is applied to the friction plate 13. That is, the pressing point $P_1$, to which the pressing force of the piston 14 is applied, in the friction plate 13 and a pressure-receiving point $P_2$ that receives the axial load are offset in the radial direction.

As described above, the restraining member 13f is constructed of the flange section 21b of the drum member 21 in the second clutch 20. Thus, for example, compared to a case where a thin member such as a snap ring is used as the restraining member, rigidity of the restraining member itself is increased. The rigidity of the restraining member 13f is increased just as described. Accordingly, even in the case where the pressing point $P_1$ at the time of receiving the axial load and the restraining member 13f are offset, deformation of the restraining member 13f is suppressed. As a result, deformation of the friction plate 13, which is associated with the deformation of the restraining member 13f, is suppressed.

As illustrated in FIG. 2, the drum member 21 in the second clutch 20 includes: an outer cylindrical section 21a, with which the outer friction plates 23a are engaged; and the flange section 21b that extends radially inward from an end portion on the one axial side of the outer cylindrical section 21a. An outer circumferential surface of the outer cylindrical section 21a is spline-fitted to an other-side extending section 11e that extends to the other axial side from the outer cylindrical section 11a in the first clutch 10. The other-side extending section 11e extends farther to the other axial side than the outer cylindrical section 21a, and a retaining member 23e, which will be described below, is spline-fitted to a portion of the other-side extending section 11e on the other axial side from the outer cylindrical section 21a. A surface on the other axial side of the outer cylindrical section 21a abuts a surface on the one axial side of the retaining member 23e. In this way, an axial position of the drum member 21 is determined.

The other-side extending section 11e is located on the radially outer side of the outer cylindrical section 11a, a step section 11f is formed between the outer cylindrical section 11a and the other-side extending section 11e, and a back surface (a surface on the one axial side) of the flange section 21b abuts the step section 11f. As described above, the flange section 21b extends to a position near an outer circumference of the second through hole 13d in the outer friction plate 13a of the first clutch 10, and thus is projected more radially inward than the outer cylindrical section 11a.

The hub member 22 includes: an inner cylindrical section 22a with which the inner friction plates 23b are engaged; a disc section 22b that extends radially inward from an end portion on the one axial side of the inner cylindrical section 22a; and a power transmission section 22c that extends to the other axial side from an inner end portion of the disc section 22b and is coupled to another rotary element.

As illustrated in FIG. 3, a spline section 23a1 that is spline-engaged with the outer cylindrical section 21a is provided on an outer circumferential surface of the outer friction plate 23a, and a spline section 23b1 that is spline-engaged with the inner cylindrical section 22a is provided on an inner circumferential surface of the inner friction plate 23b.

In a radially outer portion of the outer friction plate 23a, a plurality of third through holes 23c are provided to cause the piston 34 in the third clutch 30, which will be described below, to pass therethrough in the axial direction.

The plurality of third through holes 23c are aligned at equally spaced intervals in the circumferential direction and are provided such that a circumferential position of each of the third through holes 23c corresponds to a circumferential position of respective one of the second through holes 13d. Each of the third through holes 23c is arranged such that the circumferential position thereof matches the circumferential position of respective one of the second through holes 13d.

A radial position of each of the third through holes 23c is located on the outer side of an outer circumference of the inner friction plate 23b and is located on a radially inner side of the spline section 23a1. A radial position of the outer circumference of the inner friction plate 23b is located on the radially outer side of the first through hole 13c (see FIG. 2).

The piston 24 has: a pressing section 24a that is arranged on the one axial side of the plurality of friction plates 13 in the first clutch 10 and is formed in a comb tooth shape extending in the axial direction; a radial section 24b that extends radially inward from an end portion on the one axial side of the pressing section 24a; a cylindrical section 24c that further extends to the one axial side from an inner end portion of the radial section 24b; and a pressure-receiving section 24d that includes a pressure-receiving surface for receiving the hydraulic pressure supplied to the hydraulic chamber 25. In this embodiment, the pressing section 24a, a pair of the radial section 24b and the cylindrical section 24c, and the pressure-receiving section 24d are constructed of different bodies. An end portion on the one axial side of the cylindrical section 24c is coupled to an upper end portion of the pressure-receiving section 24d that is formed in a disc shape.

An end portion on the other axial side of the pressing section 24a is arranged next to the one axial side of the friction plate 23 and presses the friction plate 23 during the engagement. The pressing section 24a is formed in the comb tooth shape so as to correspond to the first through holes 13c in the plurality of friction plates 13. The pressing section 24a penetrates the first through holes 13c, and the piston 24 thereby meshes with the plurality of friction plates 13. The radial section 24b is arranged at such a position that an axial position thereof does not interfere with the piston 14 in the first clutch 10 during the engagement.

The hydraulic chamber 25 is arranged such that a radial position thereof is offset from radial positions of the friction plates 23. Accordingly, radial positions of the pressing section 24a and the pressure-receiving section 24d in the piston 24 are also offset in a similar manner.

On a radially inner side of the spline section 23a1 in the outer friction plate 23a, a radial dimension for providing the third through holes 23c is necessary. Accordingly, a radial position of the spline section 23a1 and a radial position of the pressing point $P_2$, at which the pressing section 24a of the piston 24 presses the friction plate 23, are also offset.

Similar to the first clutch 10, of the plurality of friction plates 23, the outer friction plate 23a that is located farthest on the other axial side constitutes the retaining member 23e. An axial dimension (a plate thickness) of the entire retaining member 23e is set to be greater than a plate thickness of each of the other outer friction plates 23a. The retaining member 23e is set such that the plate thickness of a radially inner portion is greater than that of a radially outer portion.

A restraining member 23f (in this embodiment, the drum member 31 in the third clutch 30) that restrains the axial movement of each of the friction plates 13 is arranged on the other axial side of the retaining member 23e.

Here, the drum member 31 in the third clutch 30 has: a cylindrical section 31a with which the outer friction plate 33a is engaged as illustrated in FIG. 2; and a press-fitted section 31b that extends to the one axial side from an end portion on the one axial side of the cylindrical section 31a and is press-fitted into an outer circumferential surface of the other-side extending section 11e in the first clutch 10.

The drum member 31 has a radially projected section 31c that extends radially inward from an end portion on the other axial side of the cylindrical section 31a (an adjacent position to the retaining member 23e in the second clutch 20). The radially projected section 31c extends to substantially the same radial position as a radial position of the outer circumference of the second through hole 13d.

A convex section 11c1 that is projected radially outward is provided in an end portion on the other axial side of the other-side extending section 11e, and functions as a stopper that an end surface on the one axial side of the press-fitted section 31b in the third clutch 30 abuts. Since the radially projected section 31c is provided in the drum member 31, the radially projected section 31c is used as the restraining member 23f that does not move in the axial direction and restrains the axial movement of the friction plate 23 in the second clutch 20.

As illustrated in FIG. 2, as described above, the drum member 31 in the third clutch 30 has: the outer cylindrical section 31a with which the outer friction plate 33a is engaged; the cylindrical press-fitted section 31b that further extends to the one axial side from the outer cylindrical section 31a; and the radially projected section 31c that is provided between the outer cylindrical section 31a and the press-fitted section 31b. The drum member 31 is formed to have a T-shaped cross section by the outer cylindrical section 31a, the press-fitted section 31b, and the radially projected section 31c.

As described above, the radially projected section 31c extends to a position near an outer circumference of the third through hole 23c in the outer friction plate 23a of the second clutch 20, and thus is projected more radially inward than the outer cylindrical section 21a.

The hub member 32 includes: an inner cylindrical section 32a with which the inner friction plates 33b are engaged; and a disc section 32b that extends radially inward from an end portion on the one axial side of the inner cylindrical section 32a.

Similar to the first and second clutches 10, 20, a spline section 33a1 that is spline-engaged with the outer cylindrical section 31a is provided on an outer circumferential surface of the outer friction plate 33a, and a spline section 33b1 that is spline-engaged with the inner cylindrical section 32a is provided on an inner circumferential surface of the inner friction plate 33b.

In the third clutch 30, the urging member 37 that is constructed of a conical spring or the like is disposed between each adjacent pair of the outer friction plates 33a, and the urging member 37 is provided to elastically urge the adjacent outer friction plate 33a in a separating direction. Each of these urging members 37 is arranged on the outer circumferential side of the inner friction plate 33b.

The urging member 37 is provided such that a clutch clearance is divided for each adjacent pair of the outer friction plates 33a. Each of these urging members 37 also functions as a return spring that causes the piston 34 to move to an opposite side of the friction plate.

The piston 34 has: a pressing section 34a that is arranged on the one axial side of the plurality of friction plates 13 in the first clutch 10 and is formed in the comb tooth shape extending in the axial direction; and a pressure-receiving section 34b that is arranged on a radially inner side of the pressing section 34a and includes a pressure-receiving surface for receiving the hydraulic pressure supplied to the hydraulic chamber 35.

An inner circumferential surface of the pressing section 34a is located on a radially outer side of an outer circumferential surface of the pressure-receiving section 34b, and a connection section 34c is provided between the pressing section 34a and the pressure-receiving section 34b. An end portion on the other axial side of the pressing section 34a is arranged next to the one axial side of the friction plate 33 and presses the friction plate 33 during the engagement.

As illustrated in FIG. 3, the pressing section 34a is formed in the comb tooth shape so as to correspond to the second through holes 13d and the third through holes 23c in the plurality of friction plates 13, 23. That is, the pressing section 34a penetrates the second through holes 13d and third through holes 23c, and the piston 34 thereby meshes with the plurality of friction plates 13, 23.

Similar to the first clutch 10, of the plurality of friction plates 33, the outer friction plate 33a that is located farthest on the other axial side constitutes a retaining member 33e. An axial dimension (a plate thickness) of the entire retaining member 33e is set to be greater than a plate thickness of each of the other outer friction plates 33a. A restraining member 33f that restrains the axial movement of each of the friction plates 13 is arranged on the other axial side of the retaining member 33e.

The hydraulic chambers 15, 25, 35 and the cancellation chambers 16, 26, 36 in the first, second, and third clutches 10, 20, 30 are formed by using the drum member 11 in the first clutch 10. Next, a description will be made on configurations of these hydraulic chambers and cancellation chambers 15, 25, 35, 16, 26, 36.

A boss section 1c that extends forward along a rotation centerline is provided in the end cover 1b constituting the transmission case 1, and a sleeve member 3 is fixedly fitted to an outer circumference of the boss section 1c. The drum member 11 includes: the extending section 11b that extends to the one axial side from the outer cylindrical section 11a; the vertical wall section 11c that extends radially inward from the end portion on the one axial side of the extending section 11b and is arranged such that a surface on the one axial side opposes a surface on the other axial side of the end cover 1b; and the cylindrical section 11d that extends in the axial direction in the end portion on the radially inner side of the vertical wall section 11c. In the drum member 11, the cylindrical section 11d is fitted to an outer circumference of the sleeve member 3 in a freely rotatable manner via a bush 3a. The drum member 11 is supported by the boss section 1c of the end cover 1b in a freely rotatable manner via the sleeve member 3.

The drum member 11 includes a first cylinder section 73 and a second cylinder section 74 that have cylindrical shapes respectively extending forward from an intermediate portion and an outer circumferential portion in the radial direction of a front surface of the vertical wall section 11c. The piston 14 in the first clutch 10 is fitted between an outer circumferential surface of the cylindrical section 11d and an inner circumferential surface of the first cylinder section 73, the piston 24 in the second clutch 20 is fitted between an outer circumferential surface of the first cylinder section 73 and an inner circumferential surface of the second cylinder section 74, and furthermore the piston 34 in the third clutch 30 is fitted between an outer circumferential surface of the second cylinder section 74 and an inner circumferential surface of the extending section 11b of the vertical wall section 11c. Seal members S1 to S6 are arranged on inner circumferential sides and outer circumferential sides of the pressure-receiving sections 14c, 24d, 34b of the first, second, and third clutches 10, 20, 30.

The hydraulic chamber 15 in the first clutch 10 is formed in an oil sealed state by the outer circumferential surface of the cylindrical section 11d, the front surface of the vertical wall section 11c, the inner circumferential surface of the first cylinder section 73, and a back surface of the pressure-receiving section 14c. The hydraulic chamber 25 in the second clutch 20 is formed in the oil sealed state by the front surface of the vertical wall section 11c, the outer circumferential surface of the first cylinder section 73, the inner circumferential surface of the second cylinder section 74, and a back surface of the pressure-receiving section 24d. The hydraulic chamber 35 in the third clutch 30 is formed in the oil sealed state by the front surface of the vertical wall section 11c, the inner circumferential surface of the extending section 11b, the outer circumferential surface of the second cylinder section 74, and a back surface of the pressure-receiving section 34b.

A seal plate 75 for defining the cancellation chamber 16 is fitted between an inner circumferential surface of the cylindrical section 14b of the piston 14 and an outer circumferential surface of a portion on the other axial side of the cylindrical section 11d of the drum member 11 in the first clutch 10. A seal plate 76 for defining the cancellation chamber 26 is fitted between an inner circumferential surface of the cylindrical section 24c of the piston 24 in the second clutch 20 and the outer circumferential surface of the first cylinder section 73. A seal plate 77 for defining the cancellation chamber 36 is fitted between the inner circumferential surface of the pressing section 34a of the piston 34 in the third clutch 30 and the second cylinder section 74. Seal members S7 to S9 are respectively arranged on outer circumferential sides of the seal plates 75, 76, 77.

The cancellation chamber 16 in the first clutch 10 is formed in the oil sealed state by a rear surface of the seal plate 75, the outer circumferential surface of the cylindrical section 11d, a front surface of the pressure-receiving section 14c, and an inner circumferential surface of the cylindrical section 14b. The cancellation chamber 26 in the second clutch 20 is formed in the oil sealed state by a rear surface of the seal plate 76, the outer circumferential surface of the first cylinder section 73, a front surface of the pressure-receiving section 24d, and the inner circumferential surface of the cylindrical section 24c. The cancellation chamber 36 in the third clutch 30 is formed in the oil sealed state by a rear surface of the seal plate 77, the outer circumferential surface of the second cylinder section 74, front surfaces of the pressure-receiving section 34b and the connection section 34c, and the inner circumferential surface of the pressing section 34a.

The seal members S2, S4 on the outer circumferential sides of the pressure-receiving section 14c, 24d of the first and second clutches 10, 20 are set to have substantially the same outer diameters, and the seal members S7, S8 on the outer circumferential sides of the seal plates 75, 76 in the first and second clutches 10, 20 are set to have substantially the same outer diameters. Meanwhile, as described above, the pressing section 34a in the third clutch 30 is located on the radially outer side of the pressure-receiving section 34b. Accordingly, the seal member S6 on the outer circumferential side of the pressure-receiving section 34b and the seal member S9 on the outer circumferential side of the seal plate 77 are set such that the seal member S9 has a larger outer diameter than the seal member S6.

In the cancellation chambers 16, 26 of the first clutch 10 and the second clutch 20, each of the return springs 17, 27 is disposed between the seal plate 75 and respective one of the pistons 14, 24, and each of the pistons 14, 24 is urged in the clutch disengagement direction. As described above, the return spring 37 in the third clutch 30 is arranged between the plurality of friction plates 33a.

Here, the vertical wall section 11c is provided to be orthogonal to an axis, and an inner circumferential portion, an intermediate portion, and an outer circumferential portion of this vertical wall section 11c respectively form the rear surfaces of the hydraulic chambers 15, 25, 35 of the clutches. Accordingly, the hydraulic chambers 15, 25, 35 overlap each other in the axial direction, the hydraulic chamber 25 in the second clutch 20 is superimposed on the outer circumferential side of the hydraulic chamber 15 in the first clutch 10, and the hydraulic chamber 35 in the third clutch 30 is superimposed on the outer circumferential side of the hydraulic chamber 25.

The cancellation chambers 16, 26, 36, which are respectively provided in front of the hydraulic chambers 15, 25, 35 by interposing the pistons 14, 24, 34 therebetween, in the clutches 10, 20, 30 also overlap each other in the axial direction, the cancellation chamber 26 in the second clutch 20 is superimposed on the outer circumferential side of the cancellation chamber 16 in the first clutch 10, and the cancellation chamber 36 in the third clutch 30 is superimposed on the outer circumferential side of the cancellation chamber 26.

In addition, the vertical wall section 11c of the drum member 11 is provided with: engagement hydraulic oil supply passages 80a, 80b, 80c used to supply engagement hydraulic oil to the hydraulic chambers 15, 25, 35 in the first, second, and third clutches 10, 20, 30, respectively; and cancellation hydraulic oil supply passages 90a, 90b, 90c used to supply centrifugal cancellation hydraulic oil to the cancellation chambers 16, 26, 36, respectively. Next, a description will be made on these oil passages 80a, 80b, 80c, 90a, 90b, 90c with reference to FIG. 2 and FIG. 4 to FIG. 6.

First, a description will be made on the engagement hydraulic oil supply passages 80a, 80b, 80c in the first, second, and third clutches 10, 20, 30.

As illustrated in FIG. 2, in the sleeve member 3 that is fitted to the boss section 1c of the end cover 1b, first axial oil passages 81a, 81b, 81c for the first, second, and third clutches (only the oil passage 81a for the first clutch is illustrated) are provided at different circumferential positions, and each of the first axial oil passages 81a, 81b, 81c extends in the axial direction from a control valve unit, which is not illustrated.

An outer circumferential surface of the sleeve member 3 is provided with circumferential grooves 82a, 82b, 82c for the first, second, and third clutches. The first axial oil passages 81a, 81b, 81c for the clutches respectively communicate with the circumferential grooves 82a, 82b, 82c by radial communication passages 83a, 83b, 83c (only the communication passage 83a for the first clutch is illustrated) that are formed in the sleeve member 3 and the bush 3a. A seal member S10 is arranged on both sides in the axial direction of each of the circumferential grooves 82a, 82b, 82c.

Figure 4:
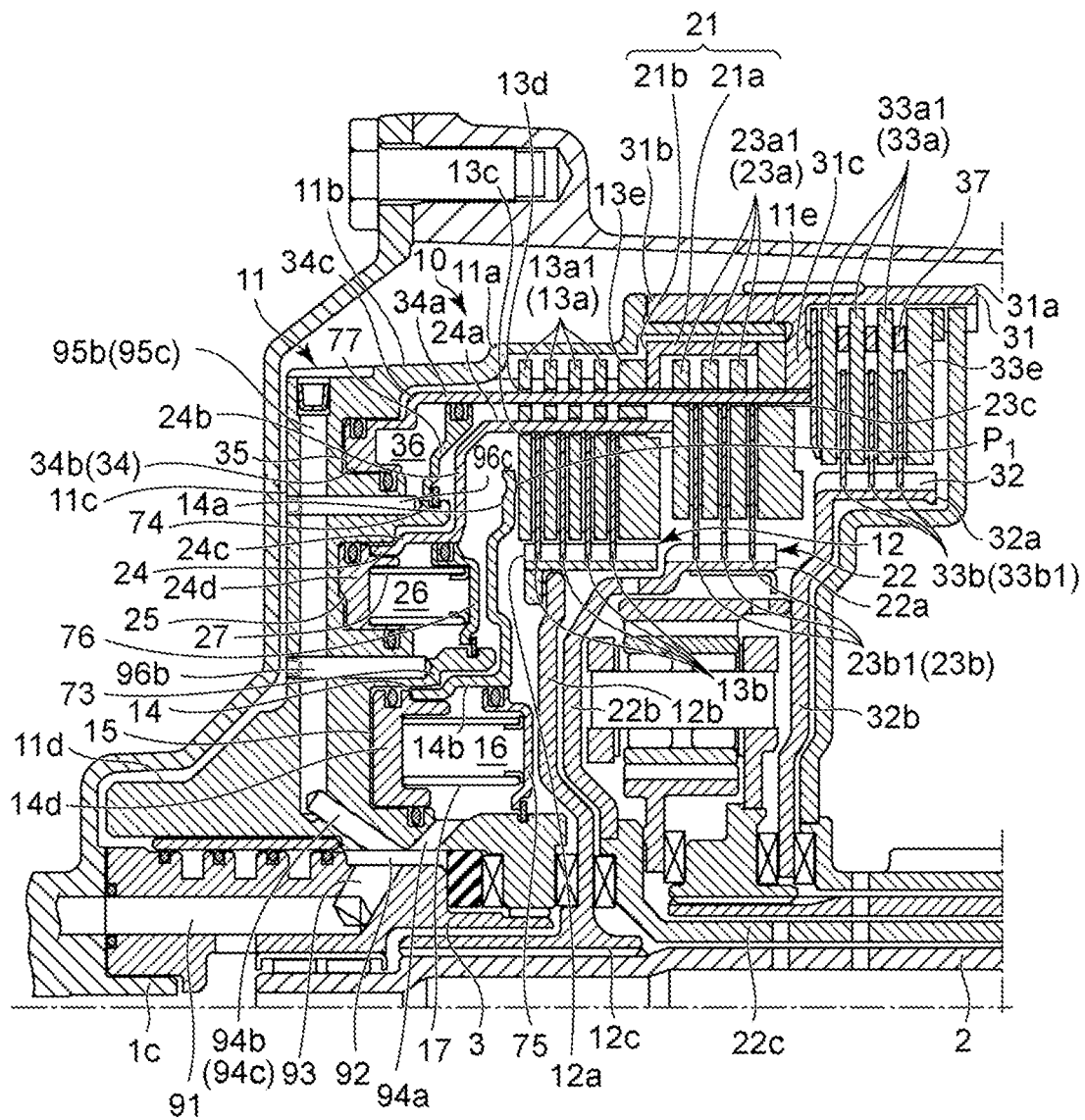
FIG. 4 is an enlarged view of another main section in FIG. 1.

As illustrated in FIG. 2 and FIG. 4, the cylindrical section 11d of the drum member 11 is provided with second axial oil passages 84a, 84b, 84c, each of which extends in the axial direction, for the first, second, and third clutches at different circumferential positions.

In an inner circumference portion of the cylindrical section 11d, communication holes 85a, 85b, 85c for the first, second, and third clutches are provided to make the circumferential grooves 82a, 82b, 82c for the clutches communicate with the second axial oil passages 84a, 84b, 84c, respectively.

In the vertical wall section 11c of the drum member 11, radial oil passages 86a, 86b, 86c for the clutches are provided to extend radially outward in the vertical wall section 11c, and respectively communicate with the second axial oil passages 84a, 84b, 84c, an inner end portion of each of which is provided in the cylindrical section 11d, for the clutches.

The radial oil passages 86a, 86b, 86c for the first, second, and third clutches are respectively provided with openings 87a, 87b, 87c that are opened in the axial direction at specified positions on a radially inner circumferential side, in intermediate portions, and on the outer circumferential side of these oil passages. The openings 87a, 87b, 87c make these radial oil passages 86a, 86b, 86c communicate with the hydraulic chambers 15, 25, 35 of the first, second, and third clutches 10, 20, 30, respectively.

In this way, the engagement hydraulic oil supply passage 80a is formed from a radial oil passage (not illustrated) in the end cover 1b to the hydraulic chamber 15 in the first clutch 10 via the first axial oil passage 81a in the sleeve member 3, the communication passage 83a, the circumferential groove 82a, the communication hole 85a, the second axial oil passage 84a, the radial oil passage 86a, and the opening 87a.

Similarly, the engagement hydraulic oil supply passage 80b is formed from the first axial oil passage 81b to the hydraulic chamber 25 of the second clutch 20 via the communication passage 83b, the circumferential groove 82b, the communication hole 85b, the second axial oil passage 84b, the radial oil passage 86b, and the opening 87b. Furthermore, the engagement hydraulic oil supply passage 80c is formed from the first axial oil passage 81c to the hydraulic chamber 35 of the third clutch 30 via the communication passage 83c, the circumferential groove 82c, the communication hole 85c, the second axial oil passage 84c, the radial oil passage 86c, and the opening 87c.

In such a case, these hydraulic oil supply passages 80a, 80b, 80c are used to axially supply the engagement hydraulic oil to the hydraulic chambers 15, 25, 35 when the openings 87a, 87b, 87c are opened in the axial direction.

Next, a description will be made on the cancellation hydraulic oil supply passages 90a, 90b, 90c used to supply the hydraulic oil to the cancellation chambers 16, 26, 36 of the first, second, and third clutches 10, 20, 30.

As illustrated in FIG. 4, in the sleeve member 3, an axial oil passage 91 is provided to extend in the axial direction from the control valve unit, which is not illustrated.

On the outer circumferential surface of the sleeve member 3, a step-down section 92 is provided on the other axial side of the circumferential grooves 82a, 82b, 82c of the clutches and communicates with the axial oil passage 91 via a first communication passage 93 in the radial direction. The first communication passage 93 is formed in the sleeve member 3.

Figure 6:
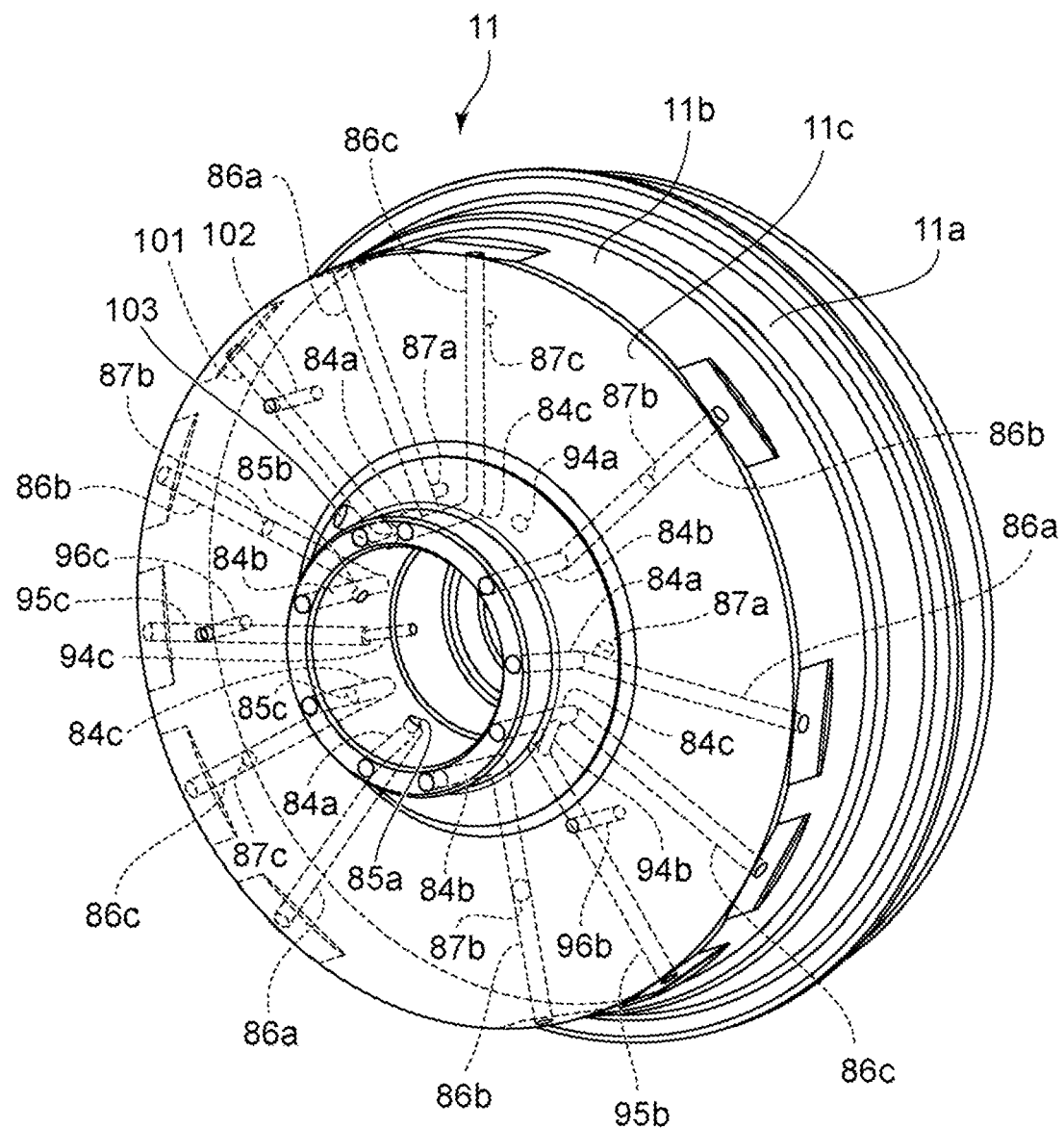
FIG. 6 is a perspective view of a drum member.

As illustrated in FIG. 4 and FIG. 6, the cylindrical section 11d is provided with a second communication passage 94a. The second communication passage 94a extends in the radial direction in a manner to be inclined forward as extending from the radially inner side to the radially outer side so as to communicate with the step-down section 92, and makes an inner circumferential surface communicate with the outer circumferential surface of the cylindrical section 11d. An opening of the second communication passage 94a on the outer circumferential surface side of the cylindrical section faces radially outward and inside of the cancellation chamber 16 of the first clutch 10 from the inner circumferential side.

In this way, the cancellation hydraulic oil supply passage 90a is configured to extend from the axial oil passage 91 to the cancellation chamber 16 of the first clutch 10 via the first communication passage 93, the step-down section 92, and the second communication passage 94a.

In the vertical wall section 11c of the drum member 11, radial oil passages 95b, 95c for disengagement of the second and third clutches 20, 30 are provided to extend radially outward within the vertical wall section 11c. Inner end portions of the radial oil passages 95b, 95c respectively communicate with second communication passages 94*b*, 94*c* that make each of the radial oil passages 95*b*, 95*c* communicate with the step-down section 92. The second communication passages 94*b*, 94*c* are provided to extend in the radial direction in a manner to be inclined rearward from the radially inner side to the radially outer side, and are provided at different circumferential positions.

The radial oil passages 95*b*, 95*c* are respectively provided with openings 96*b*, 96*c* that are opened in the axial direction at a specified position in an intermediate portion in the radial direction and a specified position on the outer circumferential side of these oil passages. The openings 96*b*, 96*c* make these radial oil passages 95*b*, 95*c* communicate with the cancellation chambers 26, 36 of the second and third clutches 20, 30, respectively.

In this way, the cancellation hydraulic oil supply passage 90*b* is configured to extend from the axial oil passage 91 to the cancellation chamber 26 of the second clutch 20 via the first communication passage 93, the step-down section 92, and the second communication passage 94*b*, the radial oil passage 95*b*, and the opening 96*b*. Similarly, the cancellation hydraulic oil supply passage 90*c* is configured to extend from the axial oil passage 91 to the cancellation chamber 36 of the third clutch 30 via the first communication passage 93, the step-down section 92, and the second communication passage 94*c*, the radial oil passage 95*b*, and the opening 96*b*.

Next, a description will be made on action of the automatic transmission according to this embodiment. First, when the engagement pressure (the engagement hydraulic oil) is supplied to the hydraulic chamber 15 of the first clutch 10 via the engagement hydraulic oil supply passage 80*a*, the first clutch 10 is engaged, and the input shaft 2 is joined to the sun gear 51 of the second planetary gear set 50.

When the engagement pressure is supplied to the hydraulic chamber 25 of the second clutch 20 via the engagement hydraulic oil supply passage 80*b*, the second clutch 20 is engaged, and the ring gear of the other planetary gear, which is not illustrated, is joined to the sun gear 51 of the second planetary gear set 50.

When the engagement pressure is supplied to the hydraulic chamber 35 of the third clutch 30 via the engagement hydraulic oil supply passage 80*c*, the third clutch 30 is engaged, and the ring gear 42 of the first planetary gear set 40 is joined to the sun gear 51 of the second planetary gear set 50.

Meanwhile, the centrifugal cancellation hydraulic oil is constantly supplied to the cancellation chambers 16, 26, 36 of the clutches 10, 20, 30 through the cancellation hydraulic oil supply passages 90*a*, 90*b*, 90*c*. Due to the pressing force, which is generated by the centrifugal force applied to this hydraulic oil, to press the pistons 14, 24, 34, the pressing force, which is generated by the hydraulic oil in the hydraulic chambers 15, 25, 35 of the clutches 10, 20, 30 in the disengaged states, to press the pistons 14, 24, 34 in an engagement direction is canceled. In this way, dragging of the friction plates 13, 23, 33 of the clutches 10, 20, 30 in the disengaged states is prevented. As a result, an increase in rotational resistance, wear of the friction plates 13, 23, 33, and the like caused by the dragging are suppressed.

As described above, the hydraulic chambers 15, 25, 35 and the cancellation chambers 16, 26, 36 of the first, second, and third clutches 10, 20, 30 are arranged to be superimposed in the radial direction at substantially the same positions in the axial direction. In this way, an axial dimension of the entire transmission is reduced. In addition, the friction plates 13, 23, 33 of the clutches 10, 20, 30 are arranged such that the disposed positions thereof are aligned in the axial direction. In this way, a radial dimension of the entire transmission is reduced.

By the way, as described above, the cancellation chambers 16, 26, 36 are provided to prevent dragging of the friction plates 13, 23, 33 that occurs when each of the friction plates 13, 23, 33 is pressed by a centrifugal force (hereinafter referred to as a "centrifugal hydraulic pressure") that is applied to hydraulic oil in respective one of the hydraulic chambers 15, 25, 35 in the disengaged state. In other words, it is preferred to make an engagement-side load Fa match a disengagement-side load Fr by a centrifugal hydraulic pressure Pr in each of the cancellation chambers 16, 26, 36. The engagement-side load Fa is applied to each of the pistons 14, 24, 34 by a centrifugal hydraulic pressure Pa in respective one of the hydraulic chambers 15, 25, 35 during the disengagement. The disengagement-side load Fr is applied to each of the pistons 14, 24, 34 from the cancellation chambers 16, 26, 36 side, respectively.

Meanwhile, during manufacturing of the automatic transmission, there is a case where the centrifugal hydraulic pressures Pr in the cancellation chambers 16, 26, 36 vary, and the disengagement-side loads Fr applied to the pistons 14, 24, 34 vary due to variation in inner diameters of the pistons 14, 24, 34, variation in outer diameters of the seal plates 75, 76, 77, and the like.

In particular, in the case where the hydraulic chambers 15, 25, 35 and the cancellation chambers 16, 26, 36 of the plurality of clutches 10, 20, 30 are arranged to overlap in the axial direction as in this embodiment, balance between the engagement-side load Fa and the disengagement-side load Fr is possibly lost even by a slight manufacturing error. This is because the hydraulic chamber 35 and the cancellation chamber 36 of the third clutch 30, which is located on the radially outer side, have larger diameters than the hydraulic chambers 15, 25 and the cancellation chambers 16, 26 on the radially inner side.

More specifically, the centrifugal hydraulic pressure is usually generated to have a magnitude that corresponds to a distance from a rotation center thereof with the rotation center being an origin (the centrifugal hydraulic pressure at zero). Accordingly, for example, in the case where an outer diameter of the seal plate 77 is increased due to the manufacturing error, the centrifugal hydraulic pressure in the cancellation chamber 36 becomes excessive. As a result, it may be necessary to supply, to the hydraulic chamber 35, such a magnitude of a hydraulic pressure that resists the centrifugal hydraulic pressure in the cancellation chamber 36 during the engagement. On the contrary, in the case where the outer diameter of the seal plate 77 is reduced due to the manufacturing error, the centrifugal hydraulic pressure in the cancellation chamber 36 becomes insufficient. As a result, it becomes difficult to cancel dragging of the friction plates caused by the centrifugal hydraulic pressure in the hydraulic chamber 35.

To handle the above problem, in this embodiment, an adjustment circuit 100 for atmospheric air release position adjustment is provided to adjust the centrifugal hydraulic pressure in the cancellation chamber 36. In the adjustment circuit 100, a portion that comes into contact with atmospheric air (an atmospheric air release position) is provided in an intermediate portion away from the rotation center, and a radial position of such a portion can be adjusted.

Figure 5:
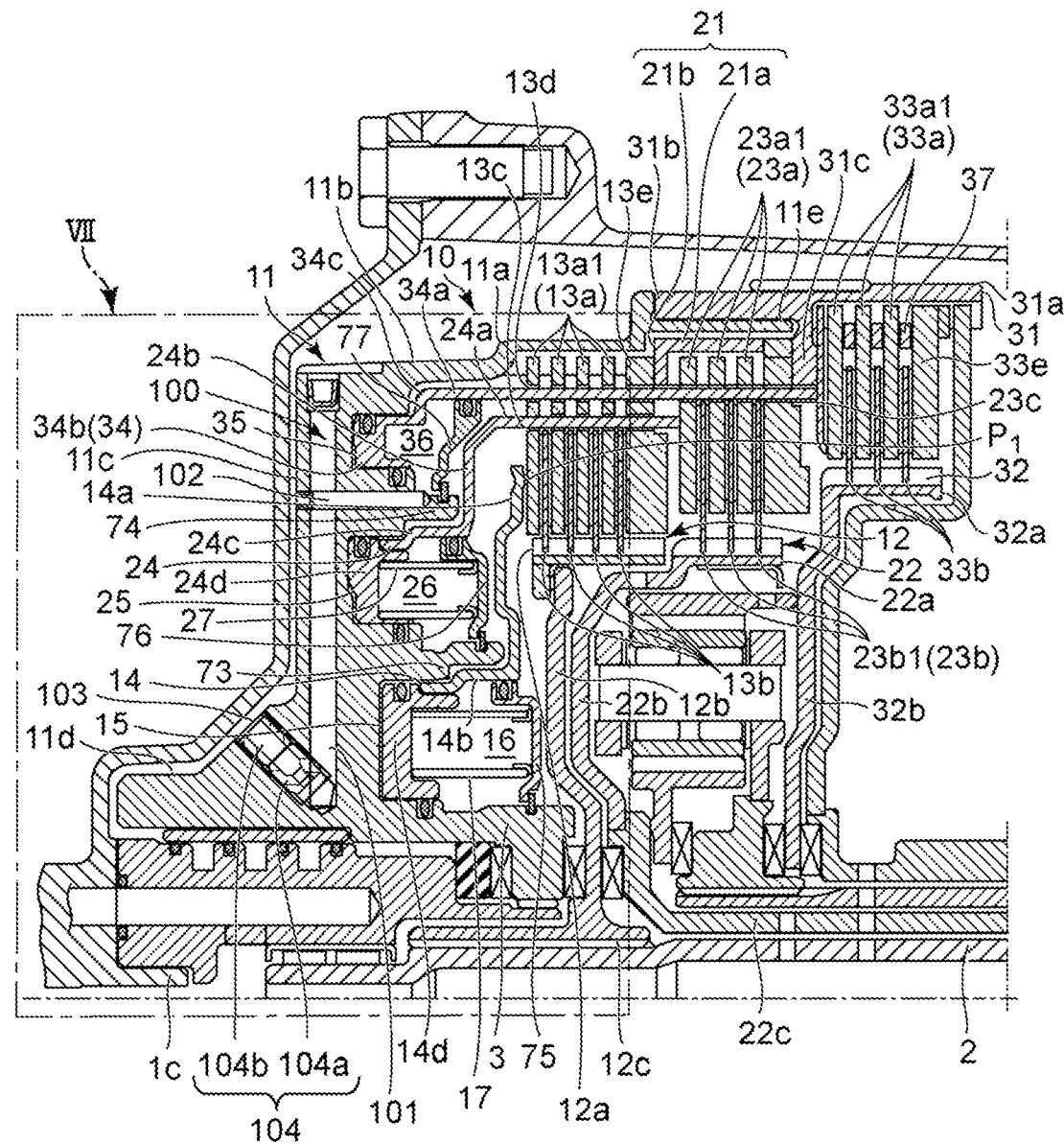
FIG. 5 is an enlarged view of further another main section in FIG. 1.

As illustrated in FIG. 5 and FIG. 6, the adjustment circuit 100 includes: a radial communication passage 101 that is provided in the vertical wall section 11*c* and extends in the radial direction; an axial communication passage 102 that makes the radial communication passage 101 communicate with the cancellation chamber 36 of the third clutch 30; and an inclined communication passage 103 that is inclined to the one axial side from an inner end portion of the radial communication passage 101 toward the radially outer side and makes the radial communication passage 101 communicate with a back surface of the vertical wall section 11c. The radial communication passage 101 is arranged at a circumferentially different position from the engagement hydraulic oil supply passages 80a, 80b, 80c and the cancellation hydraulic oil supply passages 90a, 90b, 90c.

The centrifugal hydraulic pressure is usually generated to have the magnitude that corresponds to the distance from the rotation center thereof with the rotation center being the origin (the centrifugal hydraulic pressure at zero). However, by providing the position that comes into contact with the atmospheric air (the atmospheric air release position) in the intermediate portion away from the rotation center, the centrifugal hydraulic pressure at this position is higher than zero. Thus, the centrifugal hydraulic pressure is not generated on the rotation center side.

In the adjustment circuit 100, the radial communication passage 101, which communicates with the cancellation chamber 36, is exposed to the atmospheric air via the inclined communication passage 103. Thus, the centrifugal hydraulic pressure Pr in the cancellation chamber 36 is generated from a radially outer position, at which the radial communication passage 101 crosses the inclined communication passage 103, in a manner to have the magnitude that corresponds to the distance from the rotation center thereof.

Figure 7:
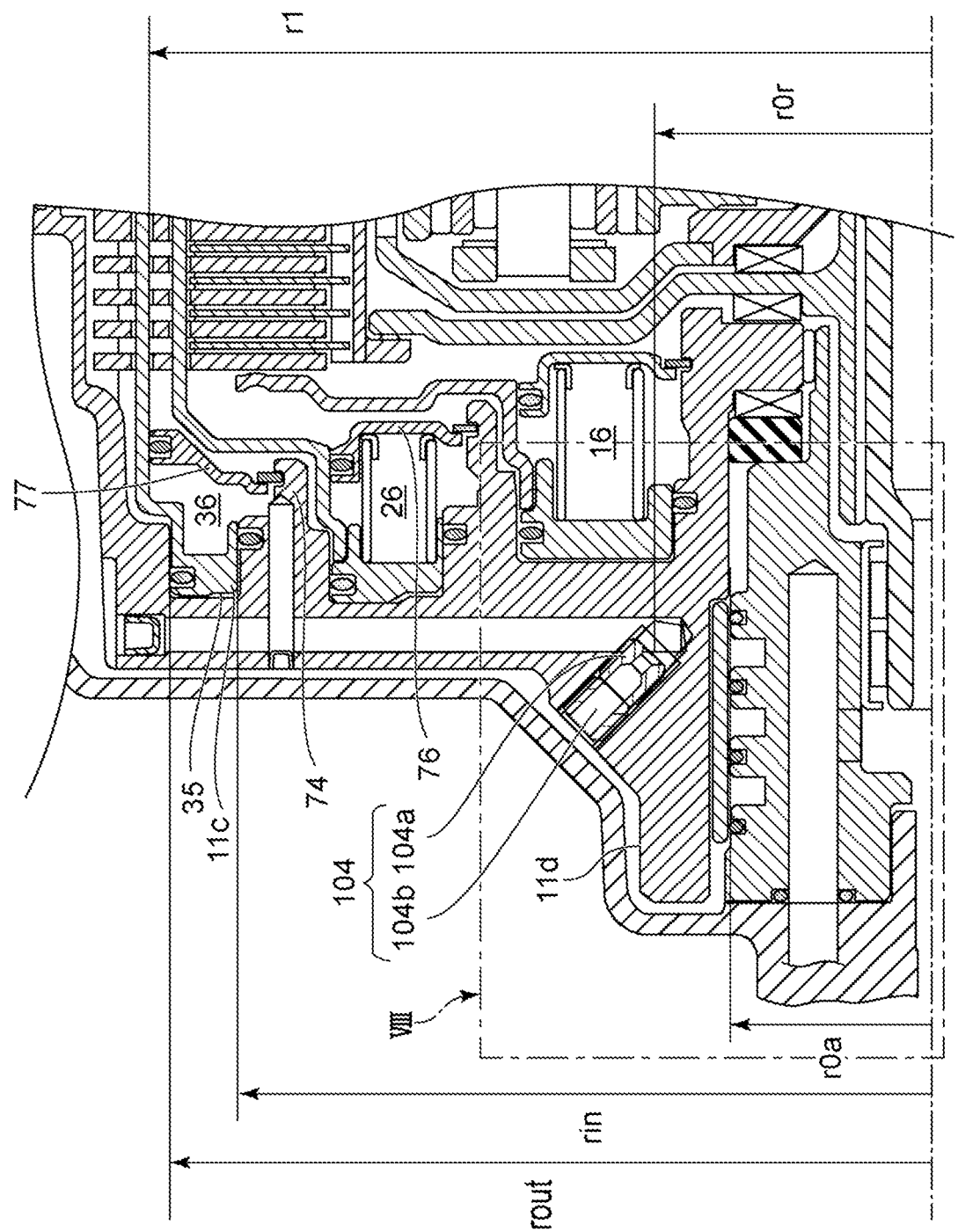
FIG. 7 is a cross-sectional view that is taken along arrow VII in FIG. 5.
Figure 8:
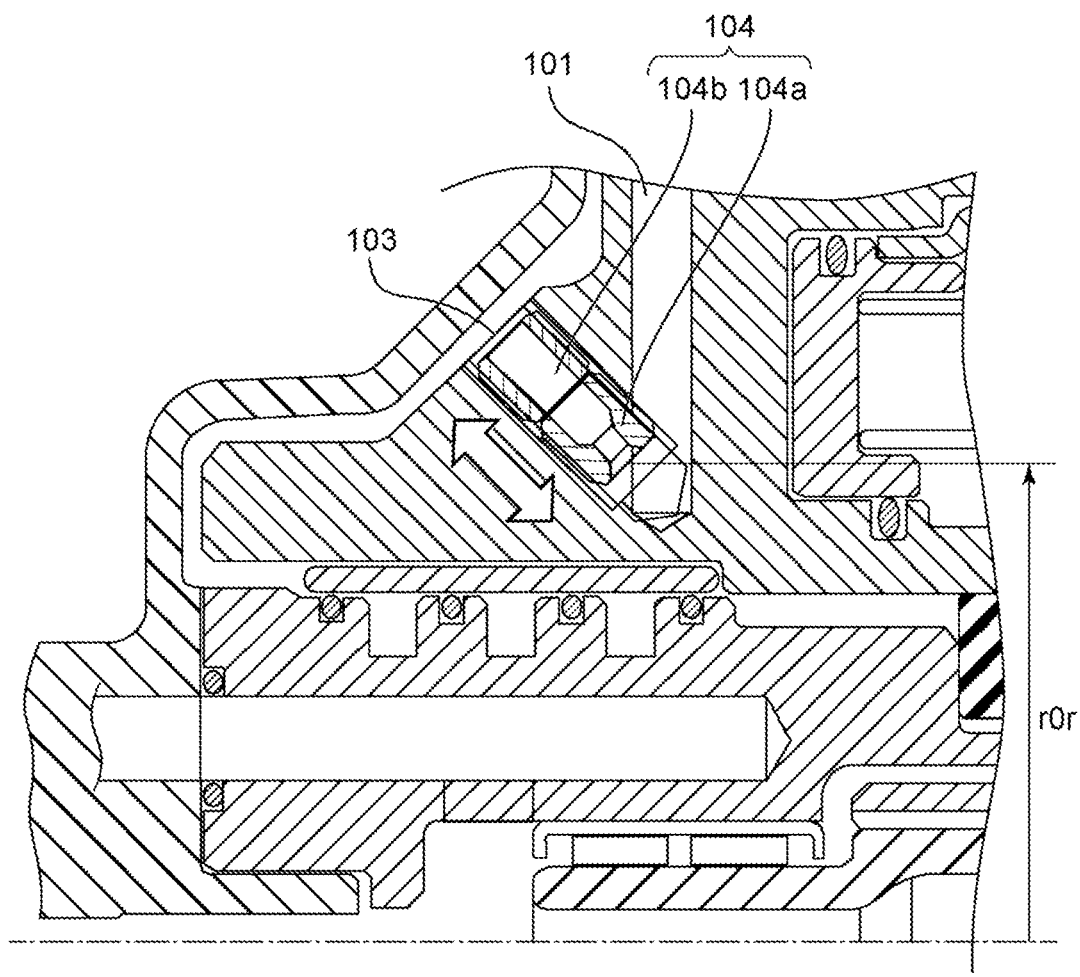
FIG. 8 is a cross-sectional view that is taken along arrow VIII in FIG. 7.

An adjustment member 104 is attached to the adjustment circuit 100 and is arranged in an inner circumferential portion of the inclined communication passage 103 in order to adjust the centrifugal hydraulic pressure Pr in the cancellation chamber 36. As illustrated in FIG. 7 and FIG. 8, the adjustment member 104 is formed to have a so-called double nut structure having two nuts 104a, 104b, each of which includes a through hole and includes a screw section on an outer circumferential surface. The adjustment member 104 is threaded to a screw section that is provided on an inner circumferential surface of the inclined communication passage 103. The adjustment member 104 has: the inner nut 104a that is located on the radially inner side of the inclined communication passage 103; and the outer nut 104b that is located on the radially outer side of the inner nut 104a. The through hole in the adjustment member 104 communicates with the cancellation chamber 36 via the inclined communication passage 103, the radial communication passage 101, and the axial communication passage 102 (see FIG. 5).

By arranging the adjustment member 104 in the inclined communication passage 103, the radial communication passage 101 is exposed to the atmospheric air via the through hole in the adjustment member 104. Thus, the centrifugal hydraulic pressure Pr in the cancellation chamber 36 is generated from the radially outer position, at which the radial communication passage 101 crosses the through hole in the adjustment member 104, in the manner to have the magnitude that corresponds to the distance from the rotation center thereof. In detail, the radially outer position, at which the radial communication passage 101 crosses the through hole in the inner nut 104a, has an innermost diameter (a release end diameter) r0r, with which the centrifugal hydraulic pressure Pr in the cancellation chamber 36 is higher than zero.

As indicated by an arrow in FIG. 8, the adjustment member 104 can be set at an unprescribed radial position in the inclined communication passage 103. For example, the adjustment member 104 is formed to include hexagon socket nuts 104a, 104b. A hexagonal wrench or the like is engaged with hexagon sockets provided in the nuts 104a, 104b, and radial positions of the nuts 104a, 104b are thereby adjusted.

When the radial position of the adjustment member 104 in the inclined communication passage 103 is changed, the radially outer position at which the radial communication passage 101 crosses the through hole in the inner nut 104a moves in the radial direction. That is, by changing the radial position of the adjustment member 104 in the inclined communication passage 103, a radial position of the release end diameter r0r of the cancellation chamber 36 is adjusted, and the centrifugal hydraulic pressure Pr in the cancellation chamber 36 is thereby adjusted.

An upper end position of the radial position of the adjustment member 104 in the inclined communication passage 103 is set such that, even in the case where the maximum manufacturing error, which is anticipated during manufacturing of the seal plate or the piston, is taken into consideration, for example, a disengagement-side load Fs+Fr, which is a sum of a load Fs applied to the piston 34 by the return spring 37 and the load Fr applied to the piston 34 by the centrifugal hydraulic pressure Pr in the cancellation chamber 36 is smaller than the engagement-side load Fa applied to the piston 34 by the centrifugal hydraulic pressure in the hydraulic chamber 35. Here, in the case where the adjustment member 104 is arranged at the upper end position, the release end diameter r0r is increased. Thus, an effective radius within which the centrifugal hydraulic pressure Pr in the cancellation chamber 36 is applied becomes the smallest.

A lower end position of the radial position of the adjustment member 104 in the inclined communication passage 103 is set such that, even in the case where the maximum manufacturing error, which is anticipated during manufacturing of the seal plate or the piston, is taken into consideration, for example, a difference between an outer diameter r1 of the seal plate 77 constituting an outer diameter of the cancellation chamber 36 and the release end diameter r0r of the cancellation chamber 36 is smaller than a difference between a piston outer diameter rout involved in the centrifugal hydraulic pressure Pa in the hydraulic chamber 35 and the radially innermost position (the innermost diameter with which the centrifugal hydraulic pressure Pa in the hydraulic chamber 35 becomes higher than zero) r0a of the engagement hydraulic oil supply passage 80c. Here, in the case where the adjustment member 104 is arranged at the lower end position, the release end diameter r0r is reduced. Thus, the effective radius within which the centrifugal hydraulic pressure Pr in the cancellation chamber 36 is applied becomes the largest.

The adjustment member 104 is provided in the inclined communication passage 103 that is inclined with respect to the radial direction that is perpendicular to the axial direction. Thus, an axial moving distance of the adjustment member 104 is shorter than a moving distance thereof along the inclined communication passage 103. For this reason, compared to a case where the adjustment member 104 is provided along the radial direction, it is possible to precisely adjust the radial position of the adjustment member 104.

In regard to the adjustment member 104, the atmospheric air release position of the cancellation chamber 36 is adjusted by the inner nut 104a, which is arranged at the radially inner position in the inclined communication passage 103, and the outer nut 104b is arranged on the radially outer side of the inner nut 104a. In this way, a restraining force of the inner nut 104a is increased. In this way, displacement of the atmospheric air release position (the release end diameter r0r), which is adjusted by the inner nut 104a, is suppressed.

Figure 9:
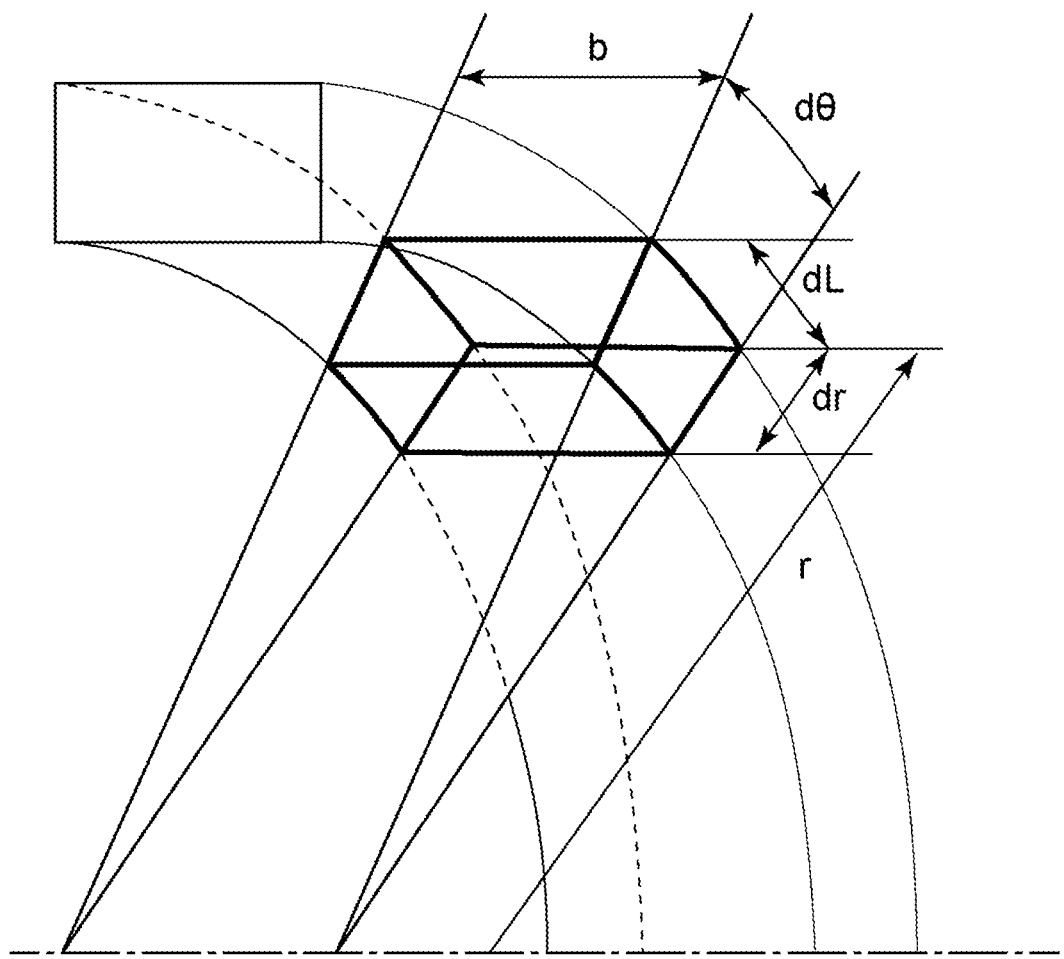
FIG. 9 is an explanatory view of a calculation method for a centrifugal hydraulic pressure.

By adjusting the adjustment member 104 just as described, the radial position of the release end diameter r0r of the cancellation chamber 36 is changed, and the centrifugal hydraulic pressure Pr in the cancellation chamber 36 can thereby be adjusted. As a result, it is possible to control the disengagement-side load Fs+Fr in a manner to match the engagement-side load Fa. This relationship will be described with reference to FIG. 9 and the following formulas. Here, FIG. 9 illustrates a minute range in the case where the load of the centrifugal hydraulic pressure applied to the piston is considered within the minute range with an unprescribed radial position ri.

A centrifugal hydraulic pressure dP, which affects an outer shell, in the minute range at the unprescribed radial position is expressed by Formula (1) when a minute mass is dm, the unprescribed radius of the minute range is ri, and rotational acceleration is ω.

$$dP = dm \cdot ri \cdot \omega^2 \cdot (1/1000) \cdot (1/1000) \quad (1)$$

When a minute angle is dθ, an arcuate length cut at the minute angle is dL, a width is b, and a minute radial length is dr, minute mass dm=b·dr·ri·dθ·ρ·(1/1000), is calculated from a volume dv=b·dr·dL, the arcuate length dL=2πri (dθ/2π), and density ρ of the minute range at the unprescribed radial ri position. Then, a centrifugal force df, which affects the outer shell, in the minute range at the unprescribed radial position is expressed by Formula (2) from the minute mass dm=b·dr·ri·dθ·ρ·(1/1000) and the rotational acceleration ω=N·2π·(1/60) at the time when a rotational speed is N.

$$df = b \cdot dr \cdot ri \cdot d\theta \cdot \rho \cdot (1/1000) \cdot ri \cdot (N \cdot 2\pi \cdot (1/60))2 \cdot (1/1000) \cdot (1/1000) \quad (2)$$

The centrifugal hydraulic pressure dP, which affects the outer shell, in the minute range at the unprescribed radial position is expressed by Formula (3) from an area dA=b·dL=b(2πri(dθ/2π)) of the outer shell of the minute range and Formula (2).

$$dP = df/dA = \\ ((b \cdot dr \cdot ri \cdot d\theta) \cdot \rho \cdot (1/1000) \cdot ri \cdot ((N \cdot 2\pi \cdot (1/60))^2 \cdot (10^{-3}) \cdot (10^{-3}))/ \\ (b \cdot (2\pi ri \cdot (d\theta/2\pi))) = 4\pi^2 \cdot \rho \cdot N^2 \cdot ri \cdot (1/3600) \cdot 10^{-9} \cdot dr \quad (3)$$

A centrifugal hydraulic pressure Pri at the unprescribed radial position is expressed by Formula (4) by integrating the centrifugal hydraulic pressure dP, which affects the outer shell in the minute range, by an unprescribed radius value ri from a release end diameter r0.

$$Pri = \int (r0 \to ri) dP = (4 \cdot \pi^2) \cdot \rho \cdot N^2 \cdot ri \cdot (1/3600) \cdot 10^{-9} dr = \\ (1/18)\pi^2 \cdot \rho \cdot N^2 \cdot 10^{-11} \cdot (ri^2 - r0^2) \quad (4)$$

A load F of a centrifugal hydraulic pressure P that is applied to the piston is expressed by Formula (5) by integrating a load applied to a minute ring area at the unprescribed radial position by a piston area. Here, the minute ring area is dB (dB=2π·ri·dr), a piston inner diameter is rin, and a piston outer diameter is rout.

$$F = (1/36)\pi^3 \cdot \rho \cdot N^2 \cdot 10^{-11} \cdot ((rout^4 - rin^4) - 2r0^2(rout^2 - rin^2)) \quad (5)$$

The engagement-side load Fa applied to the piston 34 by the centrifugal hydraulic pressure Pa in the hydraulic chamber 35 and the disengagement-side load Fr applied to the piston 34 by the centrifugal hydraulic pressure Pr in the cancellation chamber 36 are expressed by Formulas (6), (7), respectively, when an inner diameter of the piston 34 is rin, an outer diameter of the piston 34 is rout, a release end diameter of the hydraulic chamber 35 is r0a, the release end diameter in the cancellation chamber 36 is r0r, and an outer diameter of the seal plate 77 constituting the outer diameter of the cancellation chamber 36 is r1. Here, in the hydraulic chamber 35, an outer diameter position of the sleeve member 3, which is fixed to the case, is set at a release end r0a (see FIG. 7).

$$Fa = (1/36)\pi^3 \cdot \rho \cdot N^2 \cdot 10^{-11} \cdot ((rout^4 - rin^4) - 2r0a^2(rout^2 - rin^2)) \quad (6)$$

$$Fr = (1/36)\pi^3 \cdot \rho \cdot N^2 \cdot 10^{-11} \cdot ((r1^4 - rin^4) - 2r0r^2(r1^2 - rin^2)) \quad (7)$$

As indicated by Formula (6) and Formula (7), even in the case where balance between the engagement-side load Fa and the disengagement-side load Fr+Fs is lost due to the manufacturing error of the outer diameter r1 of the seal plate 77, the disengagement-side load Fs+Fr can match the engagement-side load Fa of the hydraulic chamber 35 by adjusting the release Next, a description will be made on a centrifugal balance adjustment method for the automatic transmission with reference to FIG. 10. As illustrated in FIG. 10(a), the centrifugal hydraulic pressure in the cancellation chamber 36 is adjusted in a state where the components other than the friction plates of the target clutch are assembled. At this time, the clutch is the non-rotational disengaged state, and the adjustment member 104 is adjusted to the radially outermost side in the inclined communication passage 103.

Thereafter, the clutch is rotated, so as to generate the centrifugal hydraulic pressure in each of the hydraulic chamber 35 and the cancellation chamber 36. When the adjustment member 104 is located at the radially outermost position, the centrifugal hydraulic pressure in the cancellation chamber 36 and the disengagement-side load Fr+Fs by the return spring 37 are set to be smaller than the engagement-side load Fa of the centrifugal hydraulic pressure in the hydraulic chamber 35.

In this way, as indicated by S in FIG. 10(b), the piston 34 is brought into a state of stroking to the cancellation chamber 36 side from a tip position of the piston 34 in the assembled state illustrated in FIG. 10(a). A load sensor G such as a force gauge is attached to a tip of the piston 34, and can measure a tip load of the piston 34. The tip load of the piston 34 at this time becomes a larger value than zero due to a state of pressing the friction plates.

Next, in order to make the disengagement-side load Fr+Fs match the engagement-side load Fa, the radial position of the adjustment member 104 is adjusted to such a position on the radially inner side that the tip load of the piston 34 becomes zero (a value of the load sensor is zero). When the adjustment member 104 moves radially inward, the release end diameter r0r is reduced. As a result, a distance between the release end position and the outer diameter r1 of the seal plate 77 is increased. In other words, the effective radius involved in the centrifugal hydraulic pressure in cancellation chamber 36 is increased. As a result, the load Fr applied to the piston by the centrifugal hydraulic pressure in the cancellation chamber 36 is increased. Then, as illustrated in FIG. 10(c), the piston 34 moves to the disengagement side from the stroke position in FIG. 10(b).

Thereafter, at a time point when the value of the load sensor G becomes zero (the tip load of the piston 34 becomes zero), the adjustment of the adjustment member 104 to the radially inner side is stopped. This means that a state where the load in a direction in which the piston 34 presses the friction plate 33 is zero is obtained. Thus, the adjustment of the cancellation chamber 36 for eliminating an imbalance between the centrifugal hydraulic pressure in the cancellation chamber 36 and the centrifugal hydraulic pressure in the hydraulic chamber 35.

Figure 10:
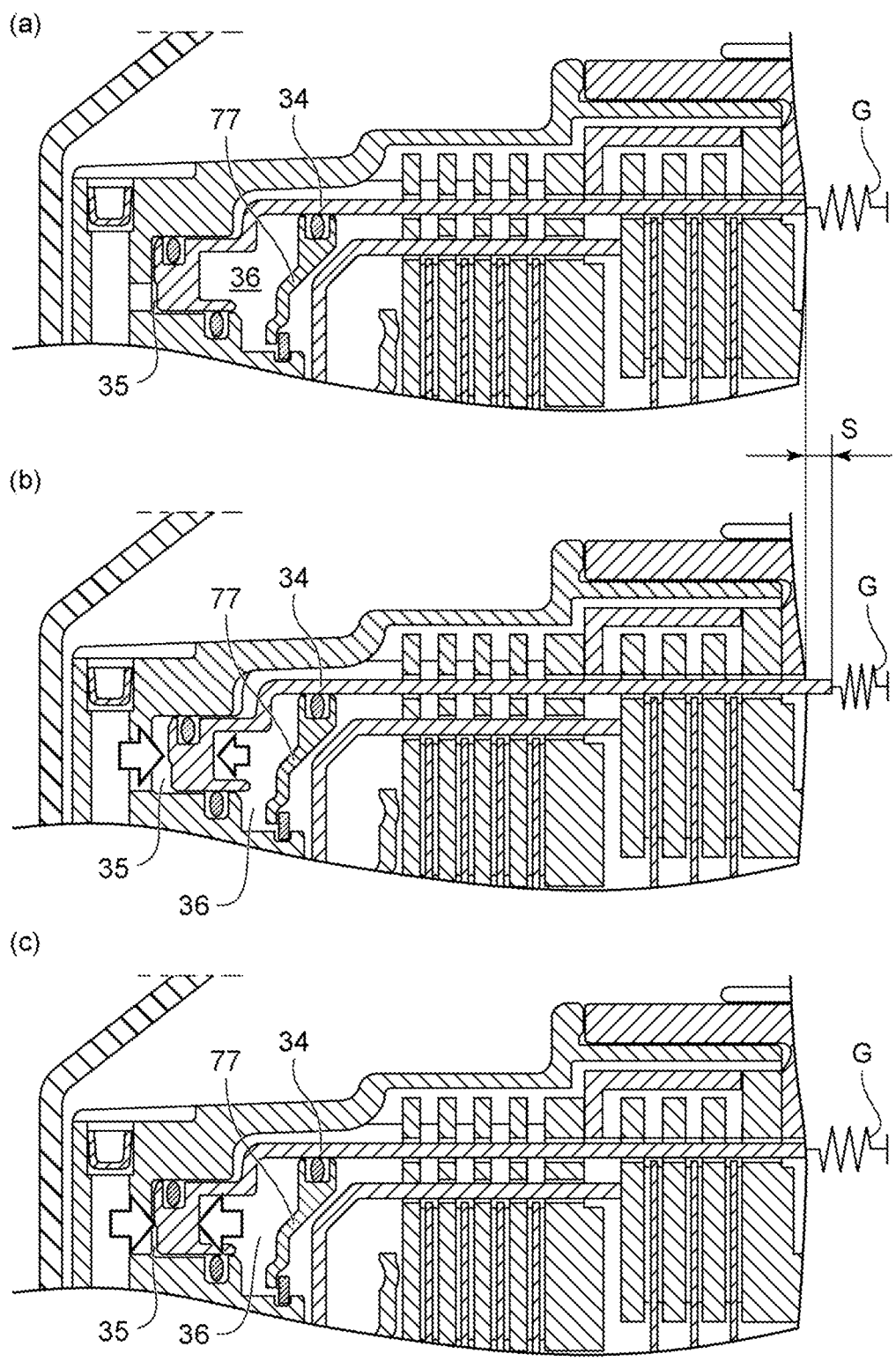
FIG. 10 includes explanatory views illustrating a centrifugal balance adjustment method.

As in the embodiment illustrated in FIG. 5, in a situation where the return spring 37 does not act on the piston 34 during the centrifugal balance adjustment as illustrated in FIG. 10, the adjustment of the adjustment member 104 to the radially inner side is stopped at a time point when the tip load of the piston 34 matches the load of the return spring 37. In this way, in a state where the transmission is finally assembled after the centrifugal balance adjustment, the tip load of the piston 34 opposes and matches the load of the return spring 37. As a result, a state where the load in the direction of pressing the friction plate 33 becomes zero is obtained. Meanwhile, in the case where the return spring is provided in the cancellation chamber 36, the load of the return spring is applied to the piston 34 during the centrifugal balance adjustment. Accordingly, the time point at which the tip load of the piston 34 becomes zero corresponds to a state of capable of obtaining the state where the load in the direction of pressing the friction plate 33 becomes zero.

Here, for example, in the case where the engagement-side load Fa (the load by the centrifugal hydraulic pressure in the hydraulic chamber 35) is larger than the disengagement-side load Fr+Fs (the load by the centrifugal hydraulic pressure in the cancellation chamber 36+ the load of the return spring) (the engagement-side load Fa> the disengagement-side load Fr+Fs), erroneous operation of the clutch engagement and dragging, which occur when the piston strokes, are possibly induced even during the disengagement of the clutch. On the contrary, in the case where the engagement-side load Fa (the load by the centrifugal hydraulic pressure in the hydraulic chamber 35) is smaller than the disengagement-side load Fr+Fs (the load by the centrifugal hydraulic pressure in the cancellation chamber 36+ the load of the return spring) (the engagement-side load Fa< the disengagement-side load Fr+Fs), a larger pressing force (engagement hydraulic pressure) than the disengagement-side load Fr+Fs is required during the engagement of the clutch, which possibly induces degraded responsiveness of the clutch and the unstable pressing force (degraded shifting shock). To handle the above problems, as described above, by adjusting the balance between the centrifugal load of the hydraulic chamber 35 and the centrifugal load of the cancellation chamber 36, it is possible to improve responsiveness of the piston stroke and to suppress the erroneous operation of the clutch.

According to the automatic transmission of the present invention, by adjusting the radial position of the adjustment member 104, it is possible to adjust the atmospheric air release position that is involved in the centrifugal hydraulic pressure in the cancellation chamber 36. In this way, by adjusting the centrifugal hydraulic pressure in the cancellation chamber 36, it is possible to eliminate the imbalance between the centrifugal hydraulic pressure in the cancellation chamber 36 and the centrifugal hydraulic pressure in the hydraulic chamber 35 possibly caused by the manufacturing error or the like.

The centrifugal hydraulic pressure is usually generated to have the magnitude that corresponds to the distance from the rotation center thereof with the rotation center being the origin (the centrifugal hydraulic pressure at zero). However, by providing the position that comes into contact with the atmospheric air (the atmospheric air release position) in the intermediate portion away from the rotation center, the centrifugal hydraulic pressure at this position is higher than zero. Thus, the centrifugal hydraulic pressure is not generated on the rotation center side.

The centrifugal hydraulic pressure is generated between the diameter (the release end diameter) from the rotation center to the atmospheric air release position and the outer diameter of the seal plate 77 in the cancellation chamber. The centrifugal hydraulic pressure in the cancellation chamber is adjusted by adjusting the radial position of the atmospheric air release position.

For example, in the case where the load applied to the piston 34 by the centrifugal hydraulic pressure in the cancellation chamber 36 is large due to the manufacturing error of the seal plate 77 or the like, it is possible to reduce the centrifugal hydraulic pressure in the cancellation chamber 36 by adjusting the position of the adjustment member 104 to the radially outer position. On the contrary, in the case where the load applied to the piston 34 by the centrifugal hydraulic pressure in the cancellation chamber 36 is small, it is possible to increase the centrifugal hydraulic pressure in the cancellation chamber 36 by adjusting the adjustment member 104 to the radially outer position.

The outer diameter of the seal plate 77, which constitutes the cancellation chamber 36, is set to be larger than the outer diameter of the piston 34, which forms the hydraulic chamber 35. Accordingly, it is possible to provide the adjustment member 104 for adjusting the centrifugal hydraulic pressure in the cancellation chamber 36 on the radially outer side of the position of the release end diameter r0a of the hydraulic chamber 35. As a result, it is possible to easily secure an adjustment margin for adjusting the atmospheric air release position to the inner diameter side for a purpose of increasing the centrifugal hydraulic pressure and an adjustment margin for adjusting the atmospheric air release position to the outer diameter side for a purpose of reducing the centrifugal hydraulic pressure in order to adjust variation in the centrifugal hydraulic pressure in the cancellation chamber 36.

For example, in the case where the outer diameter of the seal plate 77 in the cancellation chamber 36 is set to be equal to or smaller than the outer diameter of the hydraulic chamber 35, in order to increase the centrifugal hydraulic pressure in the cancellation chamber by the manufacturing error, it is considered to adjust the atmospheric air release position of the cancellation chamber 36 to the release end r0a side of the hydraulic chamber 35 (the radially inner side). However, since the radially inner side in the transmission case approaches the axis, it is difficult to secure a space for arranging the adjustment member having the specified adjustment margin.

The adjustment member 104 is arranged to be inclined with respect to the radial direction. Thus, compared to the case where the adjustment member 104 is arranged in the radial direction, it is possible to precisely adjust the radial position of the adjustment member 104 with respect to a stroke amount.

Since the adjustment member 104 has the double nut structure, it is possible to suppress the displacement of the atmospheric air release position while adjusting the atmospheric air release position with a simple structure.

The adjustment member 104 is arranged in the adjustment circuit 100 for adjusting the atmospheric air release position, and the adjustment circuit 100 communicates with the cancellation chamber 36 and differs from the supply passage 90 used to supply the cancellation hydraulic oil to the cancellation chamber 36. Accordingly, the hydraulic oil is supplied to the cancellation chamber 36 without flowing through the atmospheric air release position. In this way, compared to the case where the adjustment member 104 is provided in the supply passage 90 for supplying the hydraulic oil to the cancellation chamber 36, it is easy to maintain a state where the hydraulic oil is supplied to the cancellation chamber 36 and to avoid a state where the centrifugal hydraulic pressure is only applied to the hydraulic oil in the hydraulic chamber 35.

The adjustment circuit 100 is provided to communicate with the cancellation chamber 36 having the outermost diameter in the third clutch 30, and the cancellation chamber 36 is located on the outermost diameter side of the cancellation chambers. Thus, it is possible to adjust the atmospheric air release position of the cancellation chamber with the outermost diameter, in which the difference between the centrifugal hydraulic pressure in the hydraulic chamber 35 and the centrifugal hydraulic pressure in the cancellation chamber 36 possibly caused by the variation in the radial dimension by the manufacturing error is further likely to be increased.

The present disclosure is not limited to the exemplary embodiment, and various improvements and design changes can be made thereto within the scope that does not depart from the gist of the present disclosure.

In the embodiment that has been described so far, the three first, second, and third clutches 10, 20, 30 are superimposed in the radial direction. However, a similar configuration can be obtained when the two clutches are superimposed on the inner side and the outer side in the radial direction. Thus, the similar effects can be exerted.

In this embodiment, the description has been made on the centrifugal balance adjustment method for the automatic transmission by measuring the tip load of the piston with the load sensor. However, the present disclosure is not limited thereto. For example, the outer diameter rout of the hydraulic chamber 35 of the clutch 30, the inner diameter rin of the hydraulic chamber 35, the radially innermost position (the position at which the centrifugal hydraulic pressure starts being generated in the communication passage communicating with the hydraulic chamber (the release end diameter of the hydraulic chamber)) r0a of the communication passage 80c communicating with the hydraulic chamber 35, and the outer diameter r1 of the cancellation chamber 36 may be measured. Then, the radial position of the adjustment member 104 may be adjusted in advance from these measurement values, Formula (6), and Formula (7) such that the load (the engagement-side load) applied to the piston 34 by the centrifugal hydraulic pressure in the hydraulic chamber matches the disengagement-side load applied to the piston from the cancellation chamber 36 side. In this way, the centrifugal balance of the automatic transmission may be adjusted.

In detail, when the calculational engagement-side load Fa is first calculated from the measured outer diameter rout of the hydraulic chamber 35 of the clutch 30, the inner diameter rin of the hydraulic chamber 35, the radially innermost position (the position at which the centrifugal hydraulic pressure starts being generated in the communication passage communicating with the hydraulic chamber (the release end diameter of the hydraulic chamber)) r0a of the communication passage 80c communicating with the hydraulic chamber 35, and the formula (6), such a release end diameter r0r of the cancellation chamber 36 that the disengagement-side load Fr+Fs matches the engagement-side load Fa is expressed by Formula (8) from the calculated engagement-side load Fa, the inner diameter rin of the cancellation chamber 36, and the outer diameter r1 of the cancellation chamber 36.

$$r0r = [[\tfrac{1}{2}(r1^2 - rin^2)] \cdot [(r1^4 - rin^4) - 36(Fa - Fs)/(\pi^3 \cdot \rho \cdot N^2 \cdot 10^{-11})]]^{1/2} \quad (8)$$

The adjustment member 104 is adjusted such that the tip position on the radially inner side of the adjustment member 104 is located at r0r, which is obtained by the calculation. In this way, it is possible to adjust the atmospheric air release position that is involved in the centrifugal hydraulic pressure Pr in the cancellation chamber 36 by adjusting the radial position of the adjustment member 104 in advance. As a result, it is possible to eliminate the imbalance between the engagement-side load Fa and the disengagement-side load Fr+Fs, which is caused by the variation in the centrifugal hydraulic pressure in the cancellation chamber 36 possibly caused by the manufacturing error or the like.

Furthermore, after the radial position of the adjustment member 104, which is obtained by the calculation as described above, is set, the centrifugal balance of the automatic transmission may be adjusted by measuring the tip load of the piston 34 with the load sensor G as in the embodiment.

In this embodiment, the description has been made on the configuration in which the third clutch 30 includes the return spring 37. However, the present invention is not limited thereto. In the case where the clutch is not provided with the return spring, the radial position of the adjustment member 104 may be adjusted such that the load applied to the piston by the centrifugal hydraulic pressure in the hydraulic chamber matches the load applied to the piston by the centrifugal hydraulic pressure in the cancellation chamber.

In this embodiment, the description has been made on the configuration in which the adjustment circuit 100 is only provided for the cancellation chamber 36 of the third clutch 30. However, an adjustment circuit may be provided for each of the cancellation chambers 16, 26, which are arranged on the radially inner side of the cancellation chamber 36 in the third clutch 30, in the first and second clutches 10, 20. In this case, the outer diameter of each of the cancellation chambers 16, 26 in the first and second clutches 10, 20 is set to be larger than the outer diameter of each of the hydraulic chambers 15, 25.

INDUSTRIAL APPLICABILITY

As it has been described so far, the present disclosure provides the automatic transmission and the centrifugal balance adjustment method for the automatic transmission capable of eliminating the imbalance between the engagement-side load and the disengagement-side load, which is caused by the variation in the centrifugal hydraulic pressure in the cancellation chamber possibly caused by the manufacturing error or the like, in the automatic transmission including the hydraulic chambers and the cancellation chambers. Therefore, the present disclosure is possibly and suitably used in a manufacturing industry field of this type of the automatic transmission or a vehicle on which this type of the automatic transmission is mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 10, 20, 30 clutch
11, 21, 31 drum member (drum section)
12, 22, 32 hub member (hub section)
13, 23, 33 friction plate
14, 24, 34 piston
15, 25, 35 hydraulic chamber
16, 26, 36 cancellation chamber
80a, 80b, 80c, 90a, 90b, 90c, 101 communication passage
100 adjustment circuit
104 adjustment member
r0a release end diameter of hydraulic chamber
r0r release end diameter of cancellation chamber
r1 outer diameter of cancellation chamber
rin inner diameter of hydraulic chamber
rout outer diameter of hydraulic chamber

The invention claimed is:

1. An automatic transmission comprising:
a clutch that includes:
   a cylindrical drum section;
   a cylindrical hub section that opposes the drum section;
   a friction plate that is engaged in an axially slidable manner between the drum section and the hub section;
   a piston that presses the friction plate;
   a hydraulic chamber to which hydraulic oil is supplied to urge the piston in a direction toward the friction plate; and
   a cancellation chamber to which hydraulic oil is supplied to cancel a centrifugal hydraulic pressure applied to the hydraulic oil in the hydraulic chamber, the piston being interposed between the hydraulic chamber and the cancellation chamber, wherein
the drum section includes communication passages that extend in a radial direction and respectively communicate with the hydraulic chamber and the cancellation chamber, and
of the communication passages, in the communication passage that communicates with the cancellation chamber, an adjustment member is provided at an end portion on a radially inner side, and is configured to adjust an atmospheric air release position of the communication passage in the radial direction.

2. The automatic transmission according to claim 1, wherein an outer diameter of a cancellation chamber seal that seals an outer diameter of the piston constituting the cancellation chamber is set to be larger than an outer diameter of a hydraulic chamber seal that seals an outer diameter of the piston constituting the hydraulic chamber.

3. The automatic transmission according to claim 2, wherein the adjustment member is arranged to be inclined with respect to the radial direction.

4. The automatic transmission according to claim 3, wherein the adjustment member has a double nut structure.

5. The automatic transmission according to claim 4, wherein the adjustment member is arranged in an adjustment circuit for atmospheric air release position adjustment that communicates with the cancellation chamber, and the adjustment circuit differs from the communication passage used to supply the hydraulic oil to the cancellation chamber.

6. The automatic transmission according to claim 5, wherein
the clutch is one of at least two clutches,
the hydraulic chambers and the cancellation chambers of the at least two clutches are provided to overlap in the axial direction, and
the adjustment circuit is provided to at least communicate with the cancellation chamber located on the radially outermost side among the cancellation chambers.

7. The automatic transmission according to claim 3, wherein the adjustment member is arranged in an adjustment circuit for atmospheric air release position adjustment that communicates with the cancellation chamber, and the adjustment circuit differs from the communication passage used to supply the hydraulic oil to the cancellation chamber.

8. The automatic transmission according to claim 2, wherein the adjustment member is arranged in an adjustment circuit for atmospheric air release position adjustment that communicates with the cancellation chamber, and the adjustment circuit differs from the communication passage used to supply the hydraulic oil to the cancellation chamber.

9. The automatic transmission according to claim 2, wherein the adjustment member has a double nut structure.

10. The automatic transmission according to claim 9, wherein the adjustment member is arranged in an adjustment circuit for atmospheric air release position adjustment that communicates with the cancellation chamber, and the adjustment circuit differs from the communication passage used to supply the hydraulic oil to the cancellation chamber.

11. The automatic transmission according to claim 10, wherein
the clutch is one of at least two clutches,
the hydraulic chambers and the cancellation chambers of the at least two clutches are provided to overlap in the axial direction, and
the adjustment circuit is provided to at least communicate with the cancellation chamber located on the radially outermost side among the cancellation chambers.

12. The automatic transmission according to claim 1, wherein the adjustment member is arranged to be inclined with respect to the radial direction.

13. The automatic transmission according to claim 12, wherein the adjustment member has a double nut structure.

14. The automatic transmission according to claim 12, wherein the adjustment member is arranged in an adjustment circuit for atmospheric air release position adjustment that communicates with the cancellation chamber, and the adjustment circuit differs from the communication passage used to supply the hydraulic oil to the cancellation chamber.

15. The automatic transmission according to claim 1, wherein the adjustment member has a double nut structure.

16. The automatic transmission according to claim 15, wherein the adjustment member is arranged in an adjustment circuit for atmospheric air release position adjustment that communicates with the cancellation chamber, and the adjustment circuit differs from the communication passage used to supply the hydraulic oil to the cancellation chamber.

17. The automatic transmission according to claim 1, wherein the adjustment member is arranged in an adjustment circuit for atmospheric air release position adjustment that communicates with the cancellation chamber, and the adjustment circuit differs from the communication passage used to supply the hydraulic oil to the cancellation chamber.

18. The automatic transmission according to claim 17, wherein
the clutch is one of at least two clutches,
the hydraulic chambers and the cancellation chambers of the at least two clutches are provided to overlap in the axial direction, and the adjustment circuit is provided to at least communicate with the cancellation chamber located on the radially outermost side among the cancellation chambers.

19. A centrifugal balance adjustment method for an automatic transmission which includes a clutch that comprises a cylindrical drum section; a cylindrical hub section that opposes the drum section; a friction plate that is engaged in an axially slidable manner between the drum section and the hub section; a piston that presses the friction plate; a hydraulic chamber to which hydraulic oil is supplied to urge the piston in a direction toward the friction plate; and a cancellation chamber to which hydraulic oil is supplied to cancel a centrifugal hydraulic pressure applied to the hydraulic oil in the hydraulic chamber, the piston being interposed between the hydraulic chamber and the cancellation chamber, the drum section including communication passages that extend in a radial direction and respectively communicate with the hydraulic chamber and the cancellation chamber, the centrifugal balance adjustment method comprising:
- providing an adjustment member at an end portion on a radially inner side of the communication passage that communicates with the cancellation chamber among the communication passages, the adjustment member being configured to adjust an atmospheric air release position of the communication passage in the radial direction;
- generating the centrifugal hydraulic pressure in each of the hydraulic chamber and the cancellation chamber in a state where the adjustment member is located at a specified position on the radially outermost side; and
- adjusting the adjustment member toward a radially inner side so as to thereafter obtain a state where a load in a direction in which the piston presses the friction plate becomes zero.

20. A centrifugal balance adjustment method for an automatic transmission which includes a clutch that comprises a cylindrical drum section; a cylindrical hub section that opposes the drum section; a friction plate that is engaged in an axially slidable manner between the drum section and the hub section; and a piston that presses the friction plate; a hydraulic chamber to which hydraulic oil is supplied to urge the piston in a direction toward the friction plate; and a cancellation chamber to which hydraulic oil is supplied to cancel a centrifugal hydraulic pressure applied to the hydraulic oil in the hydraulic chamber, the piston being interposed between the hydraulic chamber and the cancellation chamber, the drum section including communication passages that extend in a radial direction and respectively communicate with the hydraulic chamber and the cancellation chamber, the centrifugal balance adjustment method comprising:
- providing an adjustment member at an end portion on a radially inner side of the communication passage that communicates with the cancellation chamber among the communication passages, the adjustment member being configured to adjust an atmospheric air release position of the communication passage in the radial direction;
- measuring an outer diameter of the hydraulic chamber, an inner diameter of the hydraulic chamber, a radially innermost position of the communication passage that communicates with the hydraulic chamber, and an outer diameter of the cancellation chamber as measurements;
- when the centrifugal hydraulic pressure is generated in each of the hydraulic chamber and the cancellation chamber, calculating, from the measurements, a radial position of the adjustment member such that an engagement-side load matches a disengagement-side load, the engagement-side load being applied to the piston from the hydraulic chamber side toward the cancellation chamber side, and the disengagement-side load being applied to the piston from the cancellation chamber side toward the hydraulic chamber side; and
- adjusting the adjustment member to the calculated radial position in advance.

* * * * *